US008249540B1

(12) United States Patent
Gupta et al.

(10) Patent No.: US 8,249,540 B1
(45) Date of Patent: Aug. 21, 2012

(54) TWO STAGE RADIO FREQUENCY INTERFERENCE CANCELLATION SYSTEM AND METHOD

(75) Inventors: Deepnarayan Gupta, Hawthorne, NY (US); Amol Inamdar, Elmsford, NY (US)

(73) Assignee: Hypres, Inc., Elmsford, NY (US)

( * ) Notice: Subject to any disclaimer, the term of this patent is extended or adjusted under 35 U.S.C. 154(b) by 590 days.

(21) Appl. No.: 12/535,843

(22) Filed: Aug. 5, 2009

Related U.S. Application Data

(60) Provisional application No. 61/087,162, filed on Aug. 7, 2008.

(51) Int. Cl.
*H04B 1/10* (2006.01)

(52) U.S. Cl. ........ 455/296; 455/295; 455/304; 455/305; 455/311

(58) Field of Classification Search .................. 455/295, 455/296, 304, 305, 310–312
See application file for complete search history.

(56) References Cited

U.S. PATENT DOCUMENTS

| 5,046,133 | A | * | 9/1991 | Watanabe et al. ............. 455/138 |
| 5,349,609 | A | * | 9/1994 | Tsujimoto ..................... 375/347 |
| 5,444,864 | A | * | 8/1995 | Smith ............................. 455/84 |
| 5,963,847 | A | * | 10/1999 | Ito et al. ........................ 455/17 |
| 6,385,435 | B1 | * | 5/2002 | Lee ................................ 455/24 |
| 6,968,171 | B2 | * | 11/2005 | Vanderhelm et al. ......... 455/296 |
| 7,058,368 | B2 | * | 6/2006 | Nicholls et al. ............ 455/114.2 |
| 7,706,755 | B2 | * | 4/2010 | Muhammad et al. ........... 455/76 |
| 7,729,431 | B2 | * | 6/2010 | Gebara et al. ................. 375/259 |
| 7,773,967 | B2 | * | 8/2010 | Smith ........................... 455/295 |
| 7,804,760 | B2 | * | 9/2010 | Schmukler et al. ........... 370/201 |
| 7,826,808 | B2 | * | 11/2010 | Faulkner .................... 455/114.2 |
| 7,953,174 | B2 |   | 5/2011 | Asbeck et al. |

* cited by examiner

*Primary Examiner* — Duc M Nguyen
(74) *Attorney, Agent, or Firm* — Steven M. Hoffberg; Ostrolenk Faber LLP

(57) ABSTRACT

A radio frequency receiver subject to a large in-band interferor employs active cancellation with coarse and fine cancellation signals, each with a respective radio frequency combiner, in order to increase the effective dynamic range of the receiver for weak signals of interest. One or both can be digitally synthesized. This is particularly applicable for co-site interference, whereby the interfering transmit signal is directly accessible. A similar system and method may also be applied to external interferors such as those produced by deliberate or unintentional jamming signals, or by strong multipath signals. An adaptive algorithm may be used for dynamic delay and gain matching. In a preferred embodiment, a hybrid technology hybrid temperature system incorporates both superconducting and semiconducting components to achieve enhanced broadband performance.

33 Claims, 16 Drawing Sheets

TWO STAGE RADIO FREQUENCY INTERFERENCE CANCELLATION SYSTEM AND METHOD

STATEMENT OF GOVERNMENT RIGHTS

This invention was made with government support under U.S. Navy contract #N00039-08-C-0022 awarded by The U.S. Navy. The government has certain rights in the invention.

FIELD OF THE INVENTION

The present invention relates to the field of radio receiver systems and methods, and more particularly to receivers which are tolerant of high levels of in-band interference.

BACKGROUND OF THE INVENTION

Radio receivers are well known. Typically, systems are designed to avoid strong interferors in the received band, or provide sufficient dynamic range in the bandwidth of the receiver to tolerate both the interferor and the signal of interest.

In order to avoid interference, the antenna and/or receiver may be designed to reject signals having particular frequency characteristics. Likewise, transmissions with defined temporal constraints may be filtered. Further, directional antennas or antenna arrays may provide spatial discrimination. These methods work to avoid interference if a signal of interest may be distinguished from an interferor by spatial, temporal or spectral characteristics. On the other hand, in many cases, interferors cannot be so distinguished.

It thus is also possible to remove interference. If the interferor is not coincident with the signal of interest, a filter may be applied to block the interferor. This possible solution requires that the interferor be sufficiently predictable that a filter may be provided, and that the filter be sufficiently precise to avoid distortion or degradation of the signal of interest. Where the interferor and signal of interest overlap, a filter is difficult or impossible to employ.

A second method of removing interferors is to provide active signal cancellation. In this case, a model of the interfering signal is created, which is then subtracted from the received signal. This requires that a sufficiently accurate representation of the interfering signal be created, and precisely matched in amplitude and phase with the actual interferor. Where the interferor is modulated, this technique must tolerate the modulated waveform, or model the modulation in real time.

See, for example, U.S. Pat. Nos. 7,362,257, 7,359,465, 6,574,270, 6,570,909, 6,501,788, 7,349,505, 7,349,504, 7,336,930, 7,333,420, 7,295,597, 7,292,552, and U.S. Patent Applications 20030053526, 20020172173, and 20020051433, each of which are expressly incorporated herein by reference.

Active noise cancellation is employed in various fields, such as audio. As the frequency of the interferor to be canceled increases, the difficulty in matching the phase of the signal also increases. If the phase mismatch is more than 90 degrees, the cancellation system can actually increase the interference. Likewise, as the bandwidth of the interferor increases, the difficulty in matching the phase delay across the entire band increases in difficulty. Thus, while interference cancellation has been deployed in various systems, its adoption at radio frequencies, for complex interferors, has been limited. See, e.g., Gardner, W. Agee, B., "Two-stage adaptive noise cancellation for intermittent-signal applications", IEEE Transactions on Information Theory, 26(6):746-750 (November 1980).

SUMMARY OF THE INVENTION

The present invention provides a self-calibrating, two stage interference cancellation architecture for mitigating interference present in a wideband receiver, and especially which avoids saturation of the receiver, or even damage to the receiver, by strong interferors.

In sensitive radio frequency receivers, the use of input protection devices may cause undesired distortion of the input, or loss of sensitivity. Therefore, a strong signal is passed directly to a sensitive input device, which may have limited input capacity.

One aspect of the present invention provides an active protection scheme for the input stage of a radio frequency receiver, in which signals which would overload the electronic input stages are cancelled. In this case, cancellation need not be limited to interferors, though in the case of high amplitude signals of interest, it is generally preferred to reduce gain, since this will often reduce the influence of interferors without increasing complexity. Since this cancellation is performed prior to amplification or other active processing of the received signal, the cancellation signal is an analog signal. Typically, the cancellation signal is generated by a digital signal processor, which is then converted to an analog signal which is summed (subtracted) with the incoming signal. Alternately, if the electronic input stages are differential, the cancellation signal may be presented as a common mode signal which is removed through a differential amplification process. In either case, the net result is to pass a signal to the electronic input stages which is within the capacity of those stages to handle, wherein the signal may still retain partial interference and even possible distortion from the first cancellation process. In a second stage of interference cancellation, interferors present in the electronically processed signal, generally prior to digitization, are removed from the signal. In this second stage, a residual interference signal, and possibly components resulting from the first stage cancellation process, are removed, leaving a representation of the received signal absent the interferors. In some cases, it may be desired to inject a signal into the receive signal chain, and this may be intentionally done by controlling the first and/or second stage cancellation signals. Likewise, in some cases, it may be desired to remove a signal which is not a true "interferor".

The two stage architecture provides an advantage in that the first stage is adapted to avoid irreversible distortion of the signal of interest while maintaining an amplitude of the interferor below a saturation or damage level for the input circuitry.

In a digital receiver according to embodiments of the present invention, there is an amplification of a received signal, followed by digitization of the amplified signal. The digitizer, on the other hand, has different saturation and possible damage issues than the analog amplification circuitry. Therefore, the second stage circuitry is directed at a different task than the first: to modify the signal which has successfully passed through the analog input stages, to remove signal components which would disrupt the digitization or later signal processing.

Typically, the first and second stage interference cancellation are controlled together, in a coordinated fashion. For example, in a linear and non-distorting signal processing chain, a digital signal representing the interference signal is generated as a multi-bit parallel representation. The high order bits are used to generate the first stage interference cancellation signal, while the low order bits, with appropriate scaling, are used to generate the second stage interference cancellation signal.

According to another embodiment, a model of an interfering signal is defined in a digital processor. The model is then used to generate two separate analog signals of appropriate precision, serving as respective first and second stage interference cancellation signals. In this case, the first stage signal has a high amplitude, and, for example, suffers from a predictable distortion, such as an intermodulation distortion. The second stage signal is generated based on the same model as the first stage, and also a model of the analog input components and the residual signal entering the analog-to-digital converter. The second stage interference cancellation signal therefore represents the residual interference which is not cancelled by the first stage signal, and intermodulation of signals, especially of the residual interferor and the signal of interest. Of course, other distributions of function are contemplated.

According to a preferred embodiment of the invention, a model of an interfering signal, for example a co-site interferor for which the data which generates the transmitted waveform is available, is used to generate a corresponding signal which is subtracted from a received signal. In particular, the invention provides a two-stage interference cancellation system, having a first stage which precedes active circuits within the receiver, and thereby reduces signal overload and permits high gain, and a second stage which is provided after amplification of the difference signal resulting from the first stage.

After the second stage, the interferor is substantially cancelled, and the signal may be directly digitized or further processed.

Since the first stage occurs prior to amplification or other processing, the cancellation signal is established to reduce the level of the resulting signal such that it does not saturate or damage remaining components of the system, and since there is a second stage, the cancellation does not have to be complete. Further, by reducing the interferor amplitude prior to passing through non-linear processing elements, such as semiconductor amplifiers, the level of intermodulation distortion is decreased.

Typically, the first stage cancellation signal represents a model of the interfering signal, which may be, for example, a representation of the source data for that signal and an interference signal path model, which for example can account for transmitter distortion, multipath, and the like. On the other hand, the second stage can be adaptively driven based on the downstream signal, less dependent on the interfering signal per se, since the output of the second stage is within the dynamic range of the receiver, permitting digital processing of the resulting signal after the second stage. Therefore, the first stage seeks to grossly cancel the interfering signal, while the second stage addresses residual components. Generally, the second stage accepts signals which are within the operating range of the circuit technology, but possibly outside the saturation range of the receiver, and produces a signal within the operating range of the receiver. The first stage, since it precedes active components, has a much larger operating range with respect to received signals, without damage or substantial distortion.

In one embodiment of the invention, the model of the interfering signal may represent the sum of multipath transmitted signals, each with its own gain and delay factors. The model may also incorporate intermodulation products of strong interfering signals, derived for example from nonlinear components in the transmit chain.

FIG. 1 shows a block diagram of an embodiment of the invention. This system represents a broadband receiver comprising components that may incorporate multiple device technologies and multiple operating temperatures. The multistage architecture enables one to select the optimum technology and temperature for each component. For example, as described in more detail below, the hybrid technology hybrid temperature (HTHT) receiver of FIG. 1 may have having room temperature semiconductors, high temperature superconductors and cooled semiconductors, and low temperature superconductors as part of an integrated system. In this architecture, the decimated output of an analog-to-digital converter (ADC) is cross-correlated with a digital-RF transmit signal in a digital correlator. This cross-correlation specifies the time delay and gain characteristic of co-site interference carried to the receiver. The correlation output is iteratively used to adjust the gain of the cancellation signal until high precision interference rejection is achieved.

The gain of the cancellation signal is digitally modeled in a look-up table. The data in the lookup table(s) may be derived from various sources, for example from a transmitter or feedback from the receiver, or both. The lookup table is, in a preferred embodiment, used to drive the second stage interference cancellation stage, and possibly the first interference cancellation stage. For example, the lookup table is used to drive a digital-to-analog converter (DAC) to generate the second stage, or fine cancellation signal, which in turn is subtracted from the first modified signal derived from the first stage (coarse) cancellation stage. The subtraction technique is, for example a magnetic flux subtractor, though other known techniques may be employed.

In some cases, such as multipath interference, the interferor can be modeled as a "fractal" or wavelet or self-similar pattern which is repeated in time or space, with a relatively simple variation between instances. In this case, a look-up table can be used to describe the basic form of the signal, with a parametric variation applied to describe the separate instances. Thus, in the case of a multipath interferor, a lookup table can describe the earliest occurrence of a signal, and may be updated adaptively, and a set of parameters describing delay and gain for each later instance used for cancellation.

The cancellation signal for the first stage cancellation signal generator may be derived directly from a transmitter-derived signal. The second stage cancellation signal may also be driven from the lookup table, or alternately or additionally, may be derived from a feedback loop within the receiver. The difference arises due to the fact that the first stage signal must generally be defined before the receiver settles, and therefore a feedback architecture, especially during startup, is problematic. On the other hand, the second stage cancellation signal may be required to avoid distortion, but in some cases, a signal usable for at least defining cancellation parameters may be available before the final second stage interference cancellation parameters are established. For example, a less sensitive or more tolerant digitizer may be provided and employed during startup. Likewise, the signal to be generated for the second stage interference cancellation may not be readily apparent from the information used to derive the first stage interference cancelling signal. Thus, while during an initialization phase, the first and second stage interference cancellation signals may be derived from a common transmit reference signal or other library reference signal, after the system is started, a feedback signal (other than the gain and delay adjustments discussed above) may be advantageously employed to define the signal parameters.

The data within the lookup table may be up-dated periodically, and therefore may be generated by slower computational components than the cancellation circuitry itself. These slower computational components may be, for example, silicon-based digital signal processors operating at room temperature or cryogenic temperatures, but not necessarily superconducting temperatures.

The gain adjustment to null the interference signal, is typically performed digitally, by adjusting the magnitudes of data in the lookup table, though this can also be adjusted digitally after the table, or as an analog gain adjustment. The phase relationship of the lookup table data and the signal may be determined using an autocorrelator, which will produce an output representing a delay and a gain factor between the signal and table data. The clocking or index of the lookup table may then be adjusted to assure maximum cancellation. A genetic or Monte Carlo algorithm may be implemented to ensure that the phase and amplitude (or more generally, time delay and gain factor) are optimally determined.

In a preferred embodiment, a self-calibration procedure is implemented which consists of an adaptive algorithm that is used to modify the gain in the look-up table (LUT). In this embodiment, interference reduction of greater than 60 dB is demonstrated in a system model.

A preferred embodiment of the interference cancellation architecture provides a two-stage hybrid temperature, hybrid technology (HTHT) scheme with a coarse canceller at high temperature, and a fine canceller at low temperature. Since the current from the input is coupled to the quantizer via a step-up current transformer, the quantizer potentially sees a much higher current, directly proportional to the turns ratio of the transformer.

The choice of turns ratio is influenced by the required mutual inductance and secondary inductance of the transformer; the values establish the current sensitivity and noise floor respectively of the analog-to-digital converter (ADC). For example, assuming a transformer turns ratio of ten, and an interference signal amplitude before the transformer of 200 mA, 2 Amperes of current will flow through the quantizer. In a worst case scenario, the first stage cancellation signal will add in-phase with the interference signal, resulting in 4 Amperes of current through the quantizer. In the absence of a current limiting device, such high currents may permanently damage the electronic device. It is difficult to place an on-chip current limiter at the low temperature superconducting (4 Kelvin) stage, and hence, it is preferred to perform the subtraction in a high temperature stage, either at 70 Kelvin stage using HTS (high temperature superconductor) materials or at room temperature. A current limiter technology may be employed similar to that disclosed in Mathias Noe, Michael Steurer, "High-temperature superconductor fault current limiters: concepts, applications, and development status", Supercond. Sci. Technol. 20 R15-R29 (2007), expressly incorporated herein by reference.

Thus, another reason for the two-stage architecture is because a current limiter is required before the sensitive receiver system, and this is preferably implemented at higher temperatures than the low temperature superconducting circuits which implement a preferred receiver. However, this high temperature stage interference canceller may not sufficiently cancel the interferor to permit direct processing, and hence a second stage canceller operating at low temperature superconducting temperatures may also be provided. For example, a delta-sigma digital to analog converter may have insufficient dynamic range and bandwidth to fully cancel the interferor in the initial stage.

It is therefore an object to provide a receiver, comprising an input adapted to receive an analog signal, such as an antenna, antenna array, or cable; a first combiner adapted to combine the analog signal with a first signal to produce a first combined signal, such as a resistive combiner, electrostatic coupler, a flux subtractor, or the like; an overload protection device adapted to selectively block the first combined signal if it represents an overload condition, to produce an overload protected signal; a second combiner adapted to combine the overload protected signal with a second signal to produce a second combined signal, such as a resistive combiner, electrostatic coupler, a flux subtractor, or the like; and a saturable detector, adapted to detect information within the second combined signal. This system therefore isolates overload conditions from the second combiner and saturable detector, which may be, for example, superconducting devices which are relatively intolerant of high power signals which must be dissipated.

It is another object to provide a communication system, comprising a first electronic subsystem adapted to generate a first digital representation associated with an interfering signal, the first digital representation being adjusted in time delay and gain factor and converted to a first analog representation and subtracted from a received signal comprising an information signal having an amplitude, forming a first difference signal wherein interference from the interfering signal is at least partially cancelled; an amplifier adapted to amplify the first difference signal; a second electronic subsystem adapted to generate a second digital representation associated with a residual signal comprising at least one of a residual interfering signal and a residual component of the first analog representation present in the difference signal, the second digital representation being adjusted in time delay and gain factor and converted to a second analog representation and subtracted from the first difference signal, forming a second difference signal wherein interference from the residual signal is at least partially cancelled; and a detector adapted to produced a response to the second difference signal at a data rate, to thereby represent the information signal, wherein said detector has at least one of: a saturation level, wherein in response to a presented signal having an amplitude below the saturation level, a detector output represents a concurrent state of the presented signal, and in response to a presented signal having an amplitude above the saturation level, the detector output is dependent on a state of a plurality of temporally spaced states of the presented signal, wherein said communication system is tolerant of an interfering signal having an amplitude sufficient to produce a presented signal to the detector above the saturation level, thereby interfering with detection of the information signal, and a dynamic range, wherein a ratio of the power of the interfering signal and the power of the information signal is in excess of the dynamic range, thereby interfering with detection of the information signal.

It is a still further object to provide a receiver, comprising: an input adapted to receive an analog signal having an information content having a first signal power and an interference content having a second signal power; a first canceller, adapted to cancel a portion of the second signal power without substantially attenuating the first signal power, and to produce a first modified signal comprising a residual interference content and the information content; an overload protection device adapted to selectively block the first modified signal if it exceeds a threshold; a second canceller, adapted to cancel at least a portion of the residual interference content to reduce a residual signal power thereof, to produce a second modified signal; and a detector, adapted to: detect the information content within the second modified signal; and produce an adaptation signal for control of at least the second canceller, wherein the first canceller is adapted to introduce a signal component into the first modified signal exceeding the threshold. The overload protection device may comprise a superconducting component, for example having a critical current density which is exceeded by an overload condition, and which therefore self-limits the current passing through the element. Of course, other configurations and implementations of the overload element may be employed. The receiver may include at least one of an analog amplifier, a digital amplifier, an analog filter, a digitizer, and a transformer. The at least one of the analog amplifier, digital amplifier, analog filter, digitizer, transformer, overload protection device, and saturable detector may operate at a cryogenic temperature below about 100 K.

It is another object to provide a system and method to detect a radio frequency signal-of-interest in an input signal, that also includes at least one interference signal, comprising: generating a digital reference signal corresponding to the at least one interference signal in at least a waveform, a magnitude and a delay; converting the digital reference signal to a corresponding analog coarse cancellation signal; combining the input signal with the analog coarse cancellation signal in a coarse combiner to generate a coarse residue signal, wherein the interference signal is substantially cancelled and the signal-of-interest is substantially maintained; generating a fine cancellation signal, corresponding to a residual interference signal in the coarse residue in at least a waveform, a magnitude and a delay; combining the coarse residue signal with the fine cancellation signal in a fine combiner, to generate a fine residue signal, wherein the residual interference signal is substantially cancelled and the signal of interest is substantially maintained; and digitizing the fine residue signal and detecting the signal-of-interest.

Another object provides a system adapted to detect a radio frequency signal-of-interest in an input signal, that also includes at least one interference signal, comprising: a coarse cancellation signal generator, producing a digital reference signal corresponding to the at least one interference signal in at least a waveform, a magnitude and a delay, which is converted to a corresponding analog coarse cancellation signal; a coarse combiner, adapted to combine the input signal with the analog coarse cancellation signal to generate a coarse residue signal, wherein the interference signal is substantially cancelled and the signal-of-interest is substantially maintained; a fine cancellation signal generator, producing a fine cancellation signal corresponding to a residual interference signal in the coarse residue in at least a waveform, a magnitude and a delay; a fine combiner, adapted to combine the coarse residue signal with the fine cancellation signal, to generate a fine residue signal, wherein the residual interference signal is substantially cancelled and the signal of interest is substantially maintained; and a digitizer adapted to digitize the fine residue signal from which the signal-of-interest is detectable.

The fine cancellation signal may be an analog signal generated based on a second digital reference signal.

The method may further comprise digitally correlating the digitized fine residue signal with the second digital reference signal; and using the time-averaged digital correlation output to provide an adaptive feedback control of at least one of the magnitude and delay of the fine cancellation signal.

The system may further comprise a digital correlator adapted to correlate the digitized fine residue signal with the second digital reference signal; and an adaptive feedback control, using the time-averaged digital correlation output, to provide of at least one of the magnitude and delay of the fine cancellation signal.

An iterative algorithm may be applied to adjust at least one of the magnitude and delay of the fine cancellation signal, in order to reduce the time-averaged digital correlation output toward zero.

The digital reference signal may be is provided by the source signal of an interference signal transmitter.

At least one of the analog coarse cancellation signal and the fine cancellation signal may comprise a linear combination of plurality of representations of a signal having respectively different magnitudes and delays.

The at least one interference signal may comprise multipath interference, and wherein the analog coarse cancellation signal comprises a plurality of representations of the digital reference signal differing in respective magnitude and delay.

The fine residue signal may be digitized using a superconducting analog to digital converter.

The fine cancellation signal may be generated based on a digital lookup table which is adaptively updated.

At least a portion of a power of the coarse residue signal may be restricted from the fine combiner by a limiter when the power of the coarse residue signal exceeds a threshold.

The fine residue signal may be digitized with a digitizer having a dynamic range, the dynamic range being insufficient to detect the signal of interest in the input signal, wherein the magnitude and delay of the digital reference signal and the fine cancellation signal are adjusted such that the dynamic range of the digitizer is sufficient to detect the signal-of-interest remaining in the fine residue signal.

The fine combiner may comprise a transformer with at least three coils. The transformer may comprise a superconducting component.

The analog coarse cancellation signal may be produced the by analog filtering an oversampled digital pulse train.

At least one of the coarse cancellation signal and the fine cancellation signal may be selectively delayed using a discrete digital time delay.

DETAILED DESCRIPTION OF THE PREFERRED EMBODIMENT

Two-Stage Hybrid Temperature Hybrid Technology Cancellation Architecture

Figure 1:
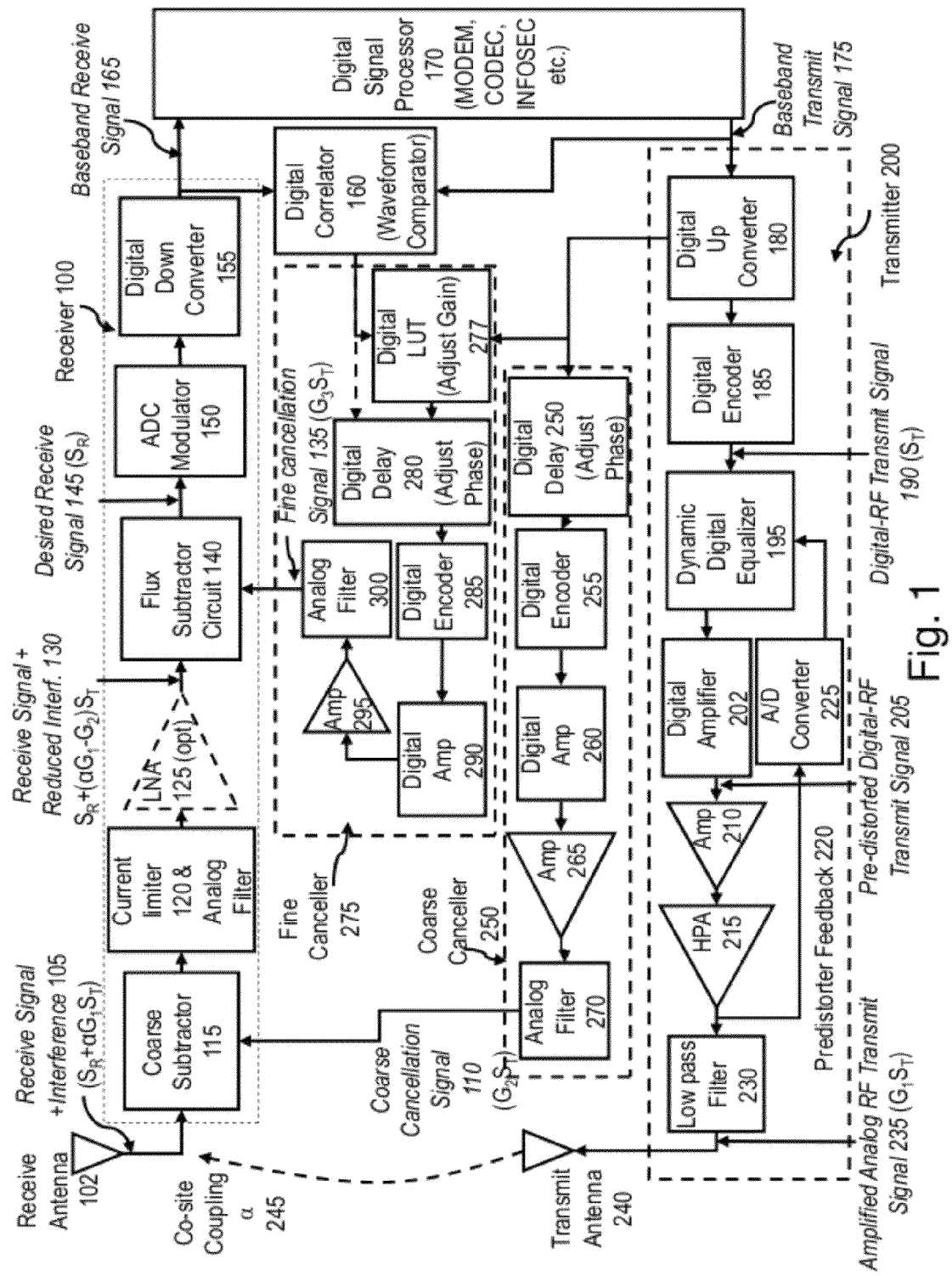
FIG. 1 shows a block diagram of a self-calibrating two-stage hybrid temperature hybrid technology interference cancellation architecture.

The two stage hybrid temperature hybrid technology (HTHT) architecture as shown in FIG. 1 seeks to accomplish two significant goals:

Provide a high precision cancellation with greater than 80 dB reduction of high power interference in the 0-30 MHz band.

Nulling the bulk of the interference in a coarse canceller at a high temperature stage. This facilitates employing a current limiting device to protect the quantizer from being permanently damaged by any high power currents that may result in event of unsuccessful cancellation.

One of the advantages of the two-stage cancellation architecture is the increased flexibility in tuning the gain of the cancellation signal. The increased flexibility comes from the fact that the total gain of the amplifier chain, in the coarse and fine cancellation paths, can be independently adjusted to change their respective outputs on a coarse and fine grid respectively. More specifically, the very high gain implemented on the coarse cancellation path, proportionally amplifies relatively smaller changes in the Look-Up Table (LUT) values, producing much larger changes in the coarse output. While this high gain enables subtracting the bulk of the interference, it limits finer changes, thereby allowing residual interference to be carried to the receiver. Although the residual interference is much smaller compared to the original interference, it can significantly reduce the dynamic range of the receiver. By subtracting a high precision, low power, fine cancellation signal in the second stage canceller, a greater mitigation of co-site interference can be achieved. The low gain amplifiers on the fine cancellation path enable generation of this high precision, low power, fine cancellation signal. The ability to manipulate the gains of the on-chip digital amplifiers, by changing their respective rail voltages, provides a possibility to adaptively control the rail voltages by means of the correlator output. Such programmability greatly enhances the possible precision of interference cancellation.

The architecture of FIG. 1 may be described in greater detail as follows. This represents a system wherein a sensitive radio-frequency receiver 100 may unintentionally receive part of the signal from a radio-frequency transmitter 200, located in close proximity at the same site. In a real-world application, every effort would be made to shield the receive antenna 102 from the transmit antenna 240, but since the transmit power may be many orders of magnitude greater than the sensitivity of the receiver, even a very small co-site coupling a from the transmit antenna to the receive antenna may tend to saturate the sensitive receiver. Let us represent the desired RF receive signal 145 at the detector 150 as $S_R$, and the RF transmit signal 190 before amplification as $S_T$. If the amplifier gain due to transmit amplifiers 202, 210, and 215 is given by a factor $G_1$, the signal 235 transmitted by transmit antenna 240 is given as $G_1 S_T$. Further, the signal 105 received by receive antenna 102 can then be expressed as $S_R + \alpha G_1 S_T$. The second term here is likely to be much larger than the first, possibly saturating or damaging the detector 150, and greatly reducing the useful dynamic range of the detector. In order to provide the greatest flexibility in cancelling the interference signal component $\alpha G_1 S_T$ from the receive signal, FIG. 1 shows a two stage interference canceller comprised of a coarse interference canceller 250 and a fine interference canceller 275. The coarse canceller and the fine canceller represent separately optimized amplifier chains for the same transmit signal $S_T$, wherein a cancellation signal is combined with the receive signal in an appropriate subtractor module. In each canceller, the gain factor and time delay may be adjusted in order to provide the greatest reduction in the presence of the interference signal $S_T$ in the receive signal 145 at the detector 150.

Consider first the coarse cancellation system. The coarse subtractor 115 is the first component in the receive chain after the receive antenna 102, and provides for wideband combination of analog signals from the antenna and the coarse canceller 250. It is identified as a subtractor, but of course an additive RF combiner will function in the same way, provided that the phase of the cancellation signal is properly reversed. Passive RF combiners are well known in the prior art, and may include, for example, transformers and Wilkinson combiner/splitters. Assume that the coarse canceller has access to the transmit signal $S_T$ from the transmitter, and that the gain factor in the amplifier chain for the coarse canceller (comprised of amplifiers 265 and 260) is given by $G_2$, where typically $G_2 \ll G_1$. Then the coarse cancellation signal 110 is given as $G_2 S_T$, and the output of the coarse subtractor 115 may be given as a receive signal with a reduced interferor $S_R + (\alpha G_1 - G_2) S_T$. We emphasize here that this is a simplified shorthand expression, and represents an attempt to match both gain and time delay factors in the interference signal $S_T$. So it is not sufficient simply to set the gain factor $G_2$ in the coarse canceller equal to $\alpha G_1$ to provide complete interference cancellation. Further, complete cancellation is not necessary (or even desirable) in the coarse canceller; the major requirement is only to reduce the interference power to the level wherein the sensitive precision components of the detector and fine canceller can work effectively. As part of the coarse processing stage, the coarse subtractor may be followed by a saturable power limiter 120, which may for example be a current limiter. This may also be combined with an analog bandpass filter that defines the band of interest. Such a limiter is important in protecting the components further downstream from high RF powers, in particular from transients when the system is first initiated or the transmitter is turned on. In addition, an optional component may be a subsequent low-noise amplifier LNA 125, to provide additional sensitivity to the receiver. Since we are focusing here on the relative power of signal and interference, we will ignore the gain factor associated with the LNA, though it is apparent that the gain can be accounted for.

Following the optional LNA 125, the next component is the fine subtractor 140, which combines the reduced interference signal 130 with the fine cancellation signal 135 from the fine canceller 275. The fine canceller also has access to the transmit signal $S_T$, and let us assume a gain factor $G_3$ from amplifiers 290 and 295. Since much of the interference has already been cancelled, one typically has $G_3 \ll G_2$. The condition that $G_3 = \alpha G_1 \cdot G_2$ represents the ideal matching of both gain and time delay (phase) of fine cancellation signal 135 and reduced interference signal 130, to yield a difference signal 145 from the fine subtractor 140 of only $S_R$, the desired receive signal.

In the embodiment shown in FIG. 1, both the receiver 100 and the transmitter 200 represent full digital RF systems, wherein the signals are processed in full digital format all the way to RF. This requires that frequency shifting is carried out using digital multipliers rather than analog mixers, and that conversion between analog and digital is carried out at high radio frequencies. This has a particular advantage in dealing with a very broad signal band which covers an octave or more in frequency, such as is present over the high-frequency (HF) signal band that covers the range from 2-30 MHz. A Digital RF™ system such as that in FIG. 1 could cover the entire HF band, in a way that a conventional analog system with only a digital baseband processor could not. We note that FIG. 1 does indeed include a conventional digital baseband processor 170 that could incorporate standard operations such as modulation/demodulation (MODEM) and coding/decoding (CODEC and INFOSEC). Further, the identifications of the baseband receive signal 165 and baseband transmit signal 175 are intended to imply a set of in-phase and quadrature (I and Q) or other conventional two-phase signals, even if local oscillators are not explicitly shown.

The sensitive detector 150 in the receiver 100 is a broadband analog-to-digital converter, that may, for example, be a broadband delta-sigma modulator, or a delta modulator, or a phase-modulation-demodulation (PMD) converter. The digital downconverter 155 is a digital multiplier, where the digital local oscillator is not explicitly shown. In the transmitter 200, the digital upconverter 180 is a similar digital multiplier, also with an unshown digital local oscillator. In general, the Digital RF™ signal from the digital upconverter may represent a mulibit signal. The conversion from a multibit Digital RF™ signal to an analog signal is integrated with the amplification process in several components shown in FIG. 1. The digital encoder 185 may convert from a multibit Nyquist rate digital signal to an oversampled single-bit signal that may in turn be converted to a pulse-width modulated signal 190, with a low frequency spectrum that represents the signal to be transmitted $S_T$. This PWM signal may then be amplified in a digital amplifier 202, and analog amplifier 210, and a high-power amplifier (HPA) 215 to achieve the needed gain factor of $G_1$. This may still consist of pulses, so that a low-pass filter 230 is needed to generate the final analog signal 235 with amplitude $G_1 S_T$ that is broadcast from the transmit antenna 240. FIG. 1 also allows for a digital equalizer 195 that generates a predistorted digital-RF transmit signal 205, that can correct for nonlinear distortion present in the transmit amplifier chain (particularly the HPA) with a predistorter feedback signal 220 that may permit the equalizer to respond dynamically.

The transmit chains for the coarse canceller 250 and the fine canceller 275 are similar to those in the transmitter 200, except that the output power levels are substantially reduced, so that an HPA is not necessary. These include a digital encoder (255 and 285), a digital amplifier (260 and 290), an analog amplifier (265 and 295), and an analog filter (270 and 300). The cancellers also have digital time delay adjustments for dynamic phase matching (250 and 280), and the fine canceller also includes a dynamic gain adjustment module 277. The gain adjustment module may include, for example, a digital lookup table (LUT) with entries that can be dynamically adjusted with input from a waveform comparator 160.

This waveform comparator may be a digital correlator that cross-correlates the baseband receive signal 165 with the baseband transmit signal 175, to detect the presence of the transmit signal in the receive signal. The feedback from the correlator 160 is designed to adjust the gain (and possibly the phase) in the fine canceller 275 in order to dynamically minimize the amplitude of the transmit signal in the receive signal. Alternatively, a similar correlation could be carried out between the RF receive and transmit signals directly, rather than at baseband.

It is important to point out that the two-stage interference approach described in FIG. 1 is not limited to co-site interference from a co-located transmitter. For example, in some military applications, the interfering signal might be an enemy jamming signal. If the interfering signal is of a form that can be digitally synthesized, perhaps out of a selection of library waveforms, then coarse and fine cancellation signals can be generated and adjusted similar to that in FIG. 1.

While the architecture outlined in FIG. 1 may be carried out using components in various device technologies, a preferred embodiment of FIG. 1 may be implemented using superconducting devices for some components. Since superconducting components typically operate at cryogenic temperatures below about 100 K, a preferred embodiment may also comprise an integrated cryogenic system that combines superconductors and cooled semiconductors to obtain improved system performance. Such a hybrid technology, hybrid temperature (HTHT) system may obtain functionality that cannot easily be achieved with any single technology on its own.

In a preferred embodiment of the receiver 100 in FIG. 1, the ADC modulator 150 and digital downconverter 155 may be implemented using superconducting Josephson junctions, based on rapid-single-flux-quantum (RSFQ) logic. The most advanced technology for RSFQ circuits is comprised of Josephson junctions based on the element niobium (Nb) and operating at a temperature of 4 K. Complex digital circuits with clock rates of 40 GHz and above are possible in this technology. The same Nb technology would be appropriate for the digital-RF components of the transmitter, namely the digital upconverter 180, the digital encoder 185, the dynamic digital equalizer 195, and the feedback ADC 225, and similarly for the canceller components: the digital LUT 277, digital delays 280 and 250, and digital encoders 255 and 285. In addition, the digital amplifiers 202, 260, and 280 might be implemented, at least in part, using superconducting components at 4 K. Finally, the low-loss analog properties of superconducting Nb could also be used for the fine subtractor 140 as a "flux subtractor", and for the analog filter 300.

A cryocooler with a cooling stage designed for deep cryogenic temperatures such as 4 K also typically has available cooling power at an intermediate temperature of 40-80 K. Such an intermediate temperature may be used in a preferred implementation for the low-noise operation of cooled semiconductor amplifiers, as well as for high-temperature superconducting analog components such as filters and transformers. For example, in the receiver 100 of FIG. 1, the coarse subtractor 115, the current limiter 120, and the LNA 125 could operate in this intermediate temperature regime. Further, transmit and canceller components that would benefit from cryogenic operation at an intermediate temperature include amplifiers 210, 265, and 290, as well as analog filter 270. The digital correlator 160 could operate at room temperature if it processes the baseband signal, or at 4 K in superconducting technology if it compares the digital-RF waveforms directly.

Figure 2:
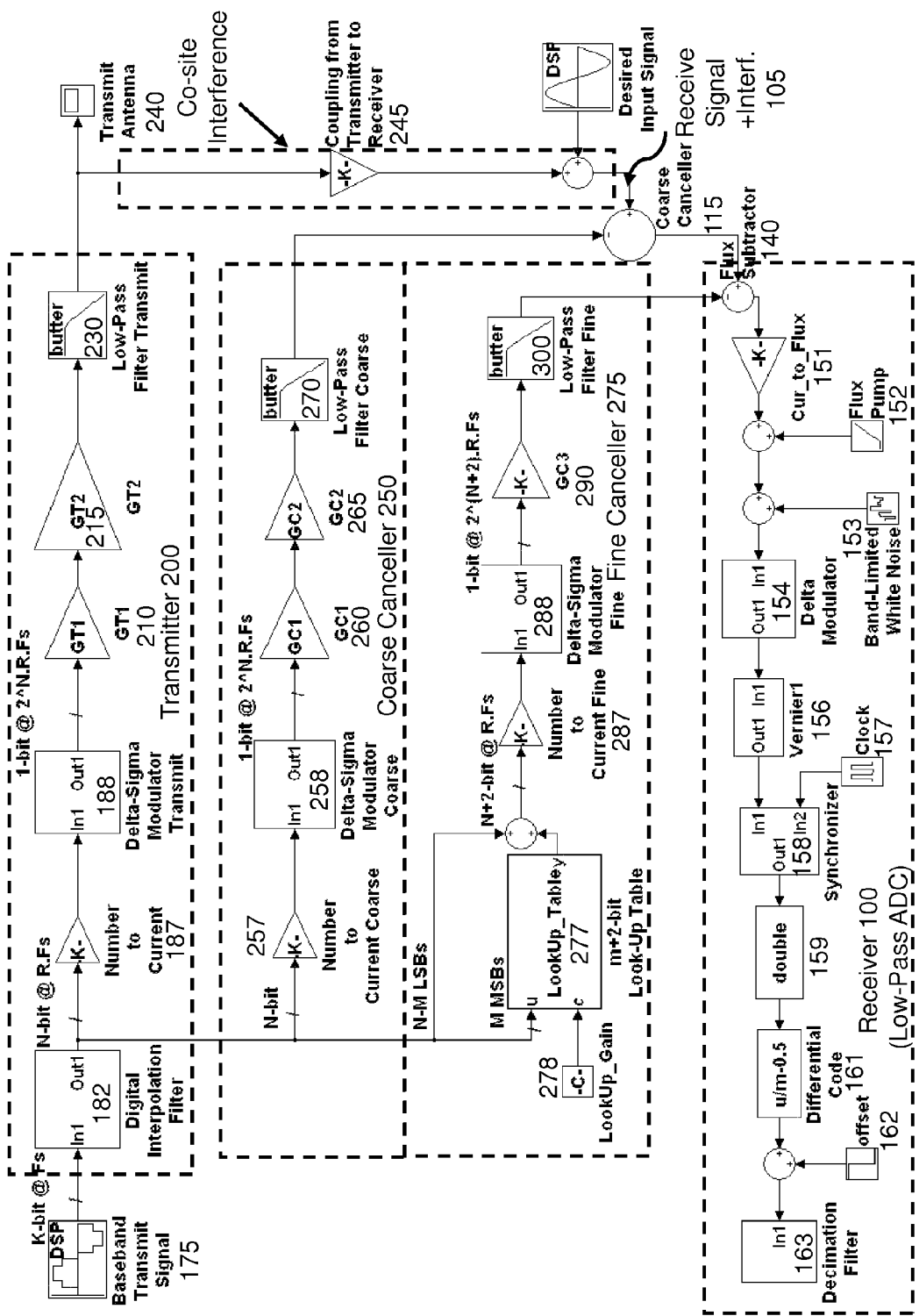
FIG. 2 shows a block diagram of a model for a two-stage HTHT interference cancellation architecture.

Model for the Two-Stage Hybrid Temperature Hybrid Technology Interference Cancellation Architecture FIG. 2 shows a more detailed architecture of a receiver system 100 and a co-site transmitter 200, together with coarse canceller 250 and fine canceller 275, that were used in a Simulink™ (Mathworks) simulation of a system similar to that in FIG. 1. Similar label numbers are used in both figures where appropriate. The transmit architecture consists of a k-bit baseband signal 175, sampled at a frequency of Fs. The following second order Hogenauer digital interpolation filter 182 inserts extra data points and effectively increases the sampling rate. The n-bit output of the digital interpolation filter is further processed by a second order delta-sigma ($\Delta\Sigma$) modulator 188 (acting as digital encoder 185 in FIG. 1) that converts the output to a single-bit or multi-bit $\Delta\Sigma$ code. A chain of amplifiers with increasing gain (GT1 210 and GT2 215) is used to boost the signal power to the required transmit signal level, followed by filtering in low-pass (Butterworth) filter 230, then broadcast with transmit antenna 240. A fraction of the transmit power 245 is coupled from transmitter 200 to receiver 100, and combined with the desired input signal to generate the receive signal+interference 105. This combined signal 105 is coupled to the coarse subtractor 115, where it is combined with the signal generated by the coarse canceller 250. The receiver 100 in FIG. 2 includes the coarse subtractor 115, the fine subtractor 140, and components that implement a low-pass superconducting ADC. These include a current to flux converter 151 with a flux pump 152, a delta modulator 154, an ADC clock 157 with a vernier timing adjustment and a two-channel synchronizer 158, a digital doubler 159, a differential code converter 161, an offset 162, and a decimation filter 163. The data can now be fed to a baseband digital correlator (not shown) for further processing. A band-limited white noise component 153 is provided in the model of the receiver, to simulate noise coupled into the receiver, On the cancellation path in FIG. 2, the output of the transmit interpolation filter 182 is passed to both a coarse canceller 250 and a fine canceller 275, each of which may be implemented as a magnetic flux subtractor. A very high static gain implemented in the coarse cancellation path subtracts the bulk of the high power interference. The coarse canceller is placed, for example, at a higher temperature stage than the fine canceller. This eases implementation of a current limiting device, which, in case of unsuccessful cancellation, prohibits large currents from flowing through to the quantizer. Each canceller also includes the same delta-sigma modulator and amplifiers as for the transmit signal.

A lookup table (LUT 277) on the fine cancellation path is used to adjust the gain of the fine cancellation signal. To reduce the LUT complexity, m MSBs from the n-bit interpolation word are used to produce m+2 MSBs, where the 2 additional bits are of higher significance; the rest of n-m LSBs are left unchanged. In other words, the LUT provides a gain of up to 4. The combined N-bits are processed by the $\Delta\Sigma$ modulator 288. The inability to change n-m LSBs in the LUT produces an error which is further amplified (290) by a small gain (GC3) in the fine cancellation path. By reducing the gain in this path, the resulting error in the cancellation signal is greatly reduced.

In contrast, the very high gain inherent in a single-stage cancellation architecture proportionally amplifies the errors in the LUT, thereby resulting in a very large residual interference being carried to the receiver. The required precision in a single stage cancellation architecture to minimize this residual signal is difficult to achieve and may increase system cost and/or complexity, or may simply not be achievable.

On-Chip Flux Subtractor

Figure 3:
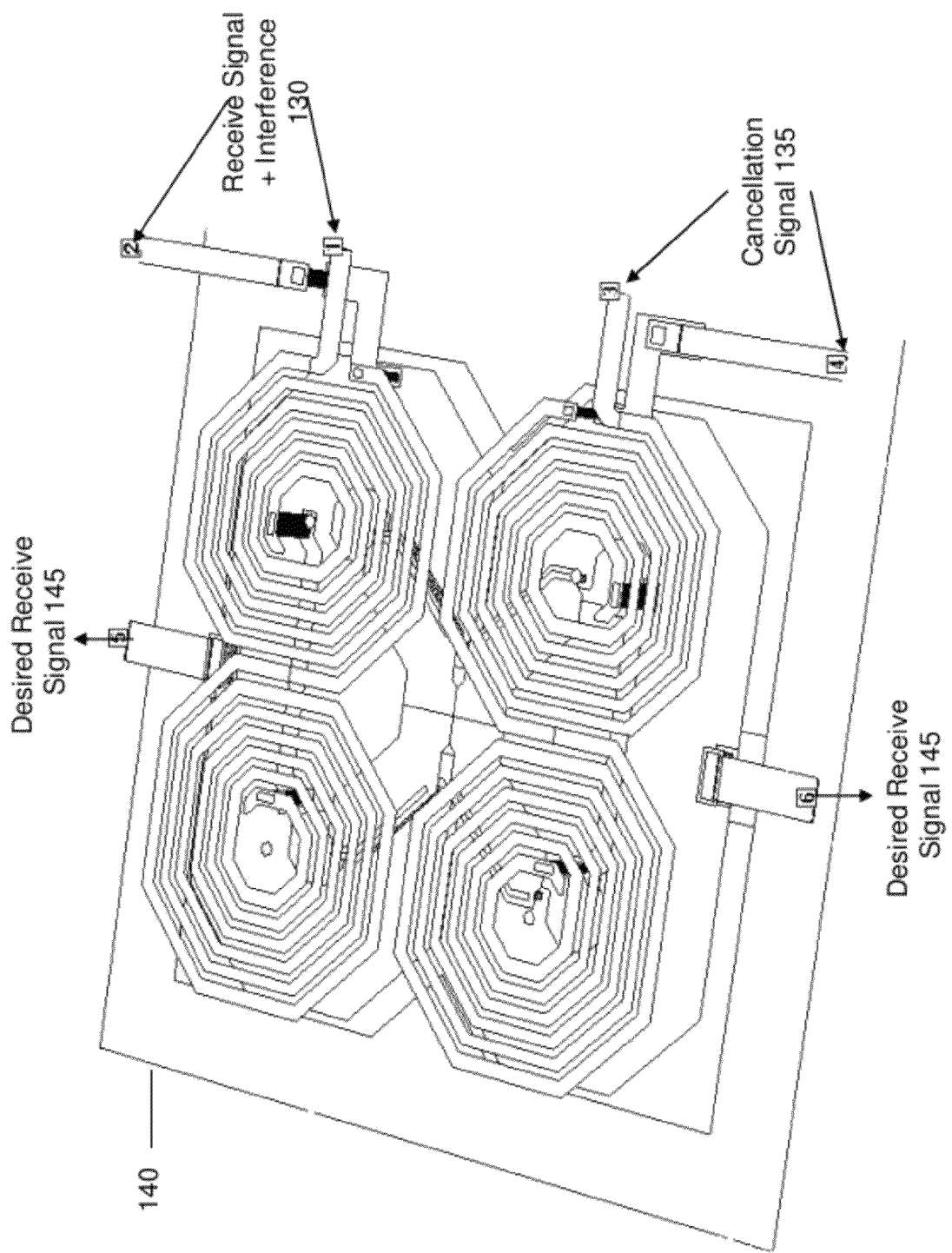
FIG. 3 shows a representation of an on-chip flux subtractor, which consists of a transformer having a 12 turn primary coil coupled to a washer type secondary, with two washers connected in parallel to reduce the effective secondary inductance.

The current carrying capability of the transformers and the quantizer will determine the amount of cancellation that can be performed on-chip, i.e., in the second stage of interference cancellation. FIG. 3 shows a flux subtractor structure (140) that can be used for on-chip second-stage fine interference cancellation. Each transformer consists of a 12 turn primary coil coupled to a single-turn washer type secondary coil. The effective secondary inductance of each transformer is reduced by connecting two washers in parallel. The secondary coils of the two transformers are connected in series. The subtraction is performed by reversing the polarity of one transformer, such that it couples current in the opposite direction with reference to the other transformer. The inputs are the receive signal+interference 130 and the cancellation signal 135, and two outputs are shown, each with the cancelled signal that represents the desired received signal 145. In the preferred embodiment, this flux subtractor is implemented using superconducting Nb technology, and designed to operate at a cryogenic temperature about 4 K.

Figure 4:
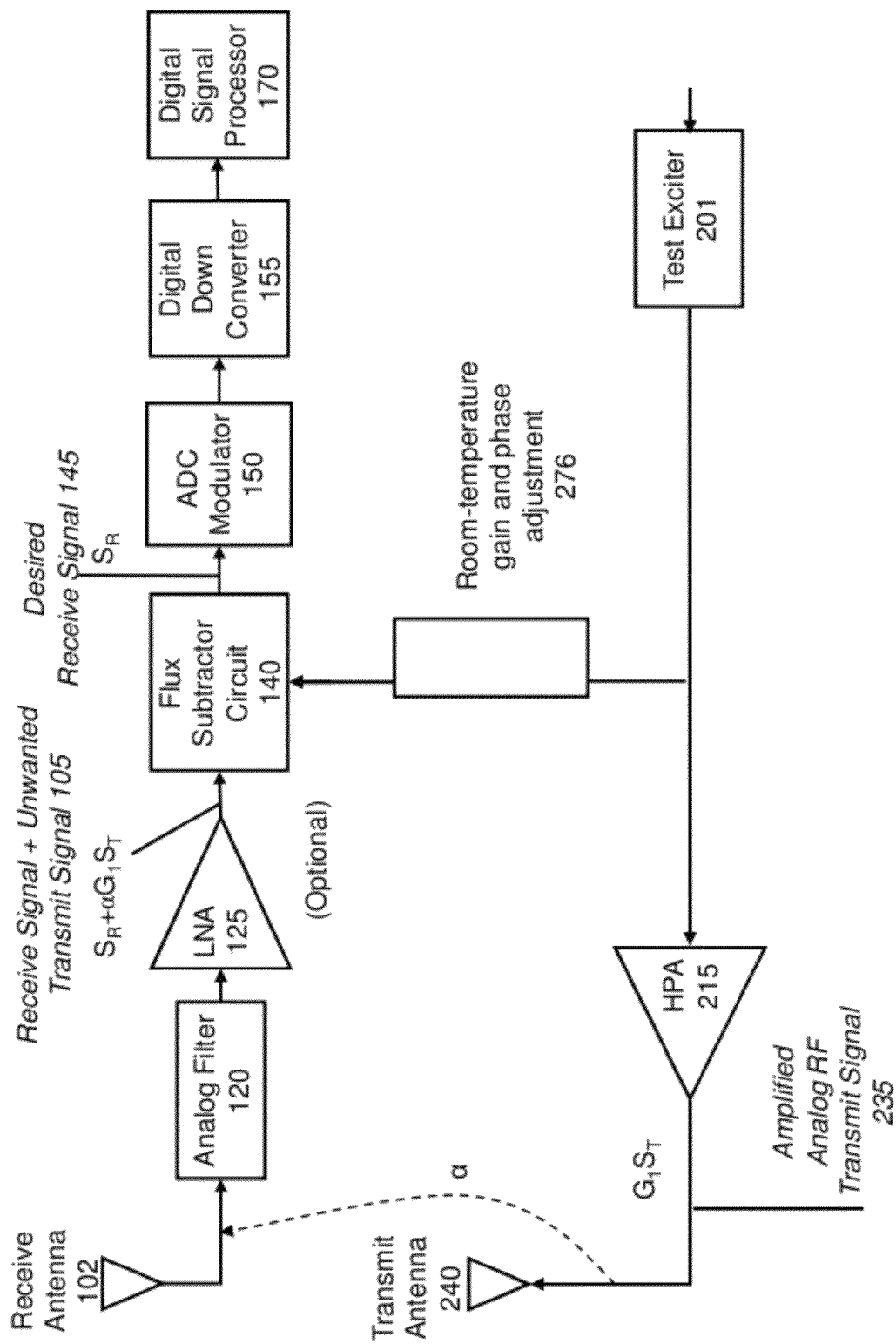
FIG. 4 shows a block diagram of a low complexity transmit signal cancellation test chip including flux subtractor and PMD ADC.
Figure 5:
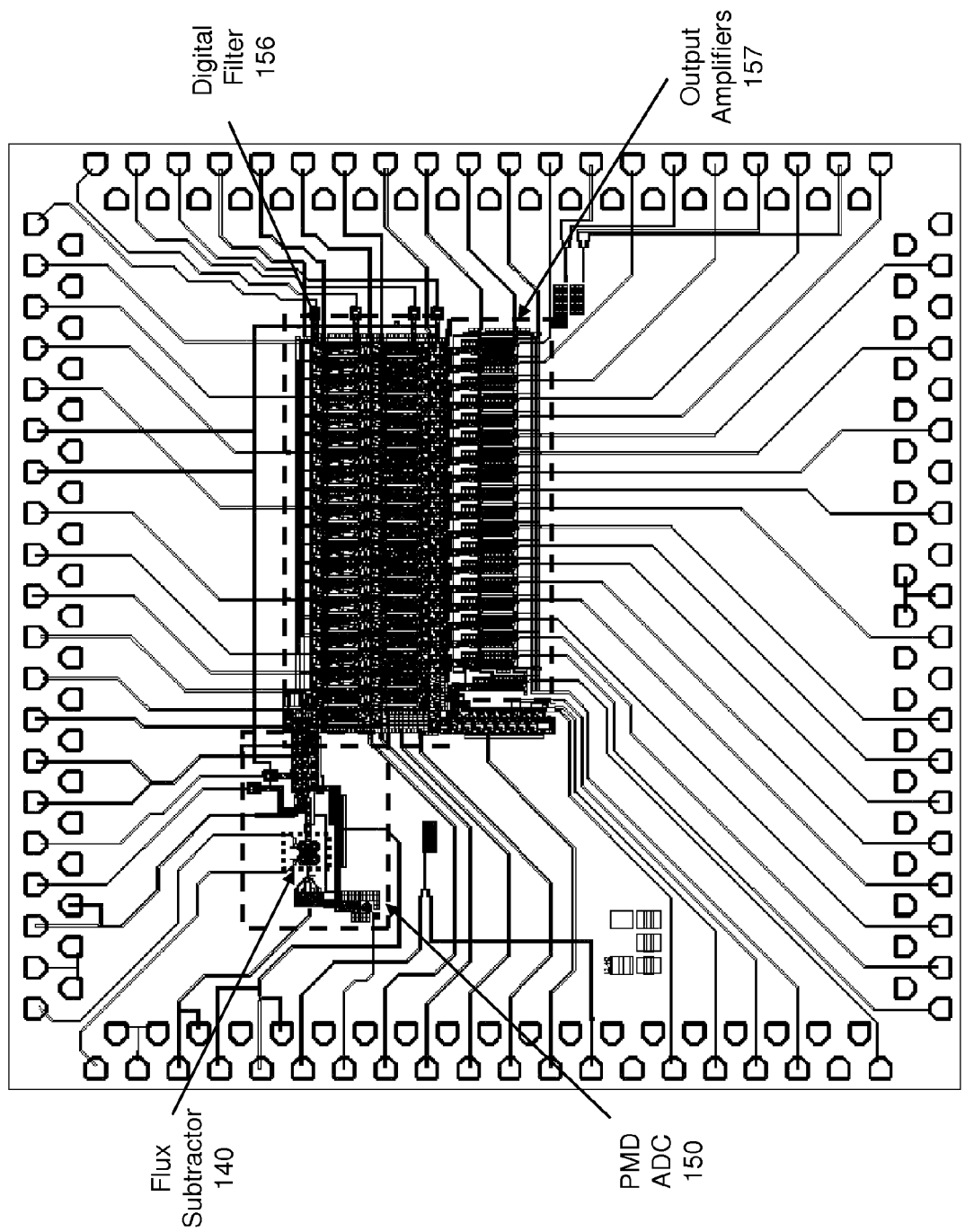
FIG. 5 shows a layout of a PMD ADC with a single junction quantizer, including a flux subtractor.

Low Pass Phase Modulation-Demodulation Analog-to-Digital Converter with Flux Subtractor The radio frequency interference cancellation design of a preferred embodiment includes a test chip that includes an integrated flux subtractor, the physical medium dependent analog-to-digital converter with a single junction quantizer, and an 18-bit digital decimation filter. FIG. 4 shows the schematic diagram of such a test chip, and FIG. 5 shows the full integrated circuit layout of such a chip implemented in superconducting Nb technology. This test chip does not include the digital cross correlator that would be present in a fully adaptive embodiment shown schematically in FIGS. 1 and 2.

The schematic in FIG. 4 is designed to perform a stand-alone test of parts of the architecture of the fine cancellation stage shown in FIGS. 1 and 2. In particular, it is designed to show how a properly designed flux subtractor 140 (such as that in FIG. 3) may enable the substantial cancellation of a relatively large interference signal deliberately added to the receiver. A test exciter 201 plays the role of a transmitter 200 in FIG. 1, generating an interference signal $\alpha G_1 S_T$. This is combined with a weak desired receive signal $S_R$, and the combined receive signal+unwanted transmit signal 105 with amplitude $S_R + \alpha G_1 S_T$ is fed to the flux subtractor 140. The other input to flux subtractor 140 comes directly from the test exciter, with a manual module 276 at room temperature, to adjust the gain and phase of this test interference signal. The output of the flux subtractor circuit is fed to a superconducting ADC modulator 150 on the same chip, followed by digital downconversion and digital processing to obtain the power spectrum of the signal. If the adjustment is optimized, the peak associated with the interferor should be greatly suppressed, permitting the desired receive signed 145 to be measured with high dynamic range.

The test chip in FIG. 5 shows the layout of a superconducting integrated circuit, 1 cm across, comprised of a superconducting flux subtractor 140 as in FIG. 3, a phase-modulation-demodulation ADC 150, and a digital filter 156 that decreases the output data rate. Digital output amplifiers 157 send the multibit difference signal out to room-temperature digital signal processors for analysis of the power spectrum. Preliminary tests of the flux subtractor have confirmed basic operation.

Simulation of Hybrid Temperature Hybrid Technology Architecture

Two simulations based on the architecture of FIG. 2 were carried out and are described below. In the first simulation, ideal matching of the transmit signal to the cancellation signal was assumed, and the results are shown in FIGS. 6-8. The two stage interference cancellation architecture was shown to enable more than 80 dB reduction of high power interference in the 0-30 MHz band, and is 40 dB better than a comparable single-stage cancellation architecture. Simulation results show a 55 dB SNR and 56 dB SFDR for a 9.7 MHz input signal in 58 MHz bandwidth and in the presence of 31 dBm high power interferors at 25 MHz. The second simulation describing a self-calibrating dynamic two stage interference cancellation architecture is shown later in FIGS. 9-14.

For simulation purposes, a 2-bit baseband transmit signal was employed, sampled at 125 MHz. An additional bit is used as a sign bit. Thus the baseband signal amplitude is restricted between ±4. For the ease of simulation, an 8-bit interpolation filter (excluding the sign bit) was employed. 4 MSBs of the interpolation filter are passed to the 6-bit LUT, resulting in a 10-bit combined output. The output of the superconductor digital amplifier is assumed to be 10 mV at 50 Ohm load, which translates into 200 µA of maximum current output. The number to current converter in FIG. 2 appropriately scales the output of the LUT such that the maximum possible LUT output is mapped to 200 µA of current. The outputs are processed by a second order ΔΣ modulator. Again for simplicity of simulation, a 1-bit quantizer is assumed. This results in the modulator being sampled at $2^N \cdot Fs$, equal to 128 GHz. Although such high sampling frequencies are not possible with current fabrication technology, a multi-bit quantizer (q-bit) may be used in the implementation, thereby reducing the sampling frequency by a factor of $2^{(q-1)}$. For example, a 4-bit quantizer would reduce the sampling frequency to 128/8=16 GHz, which is well within current capabilities using RSFQ technology available from Hypres Inc. (Elmsford, N.Y.).

On the transmit signal path, a 108 dB cumulative amplification following the on-chip superconductor amplifier is assumed to model a 7.88 kW transmitter. The output is lowpass filtered with a third order Butterworth filter with its passband edge at 317 MHz. A small fraction of the transmit power (1.73%) is coupled to the receiver, resulting in high power interference signal. For the selected signal amplitude, interference of 31.5 dBm is carried to the receiver.

Figure 6B:
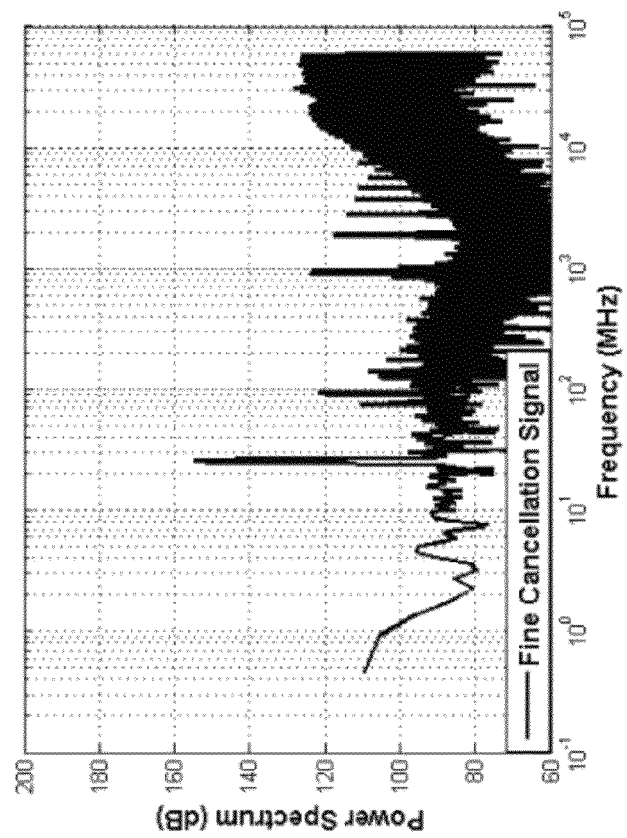
FIGS. 6A and 6B show graphs of a power spectrum of coarse and fine cancellation signals before lowpass filtering; the power in fine cancellation signal shown in FIG. 6B is 44.5 dB lower than the coarse cancellation signal shown in FIG. 6A.
Figure 6A:
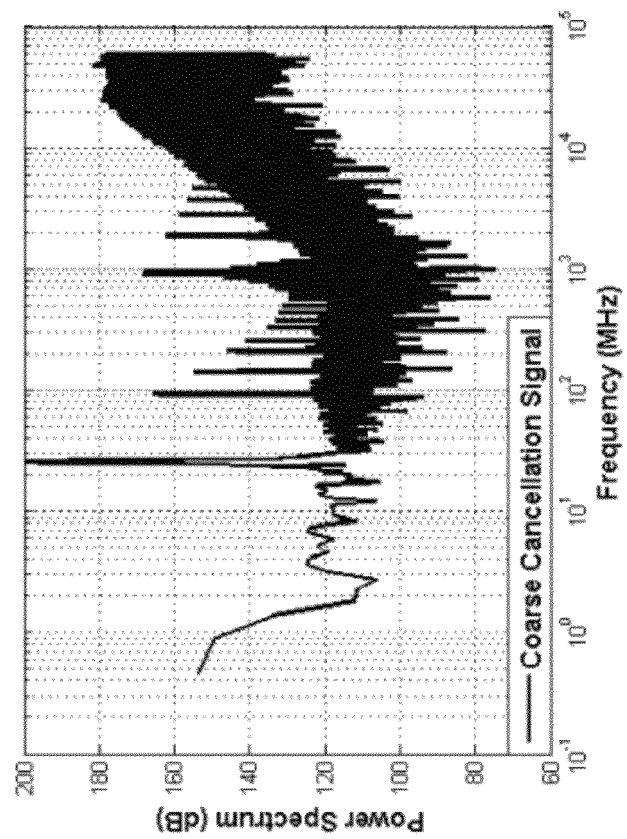
Figure 7A:
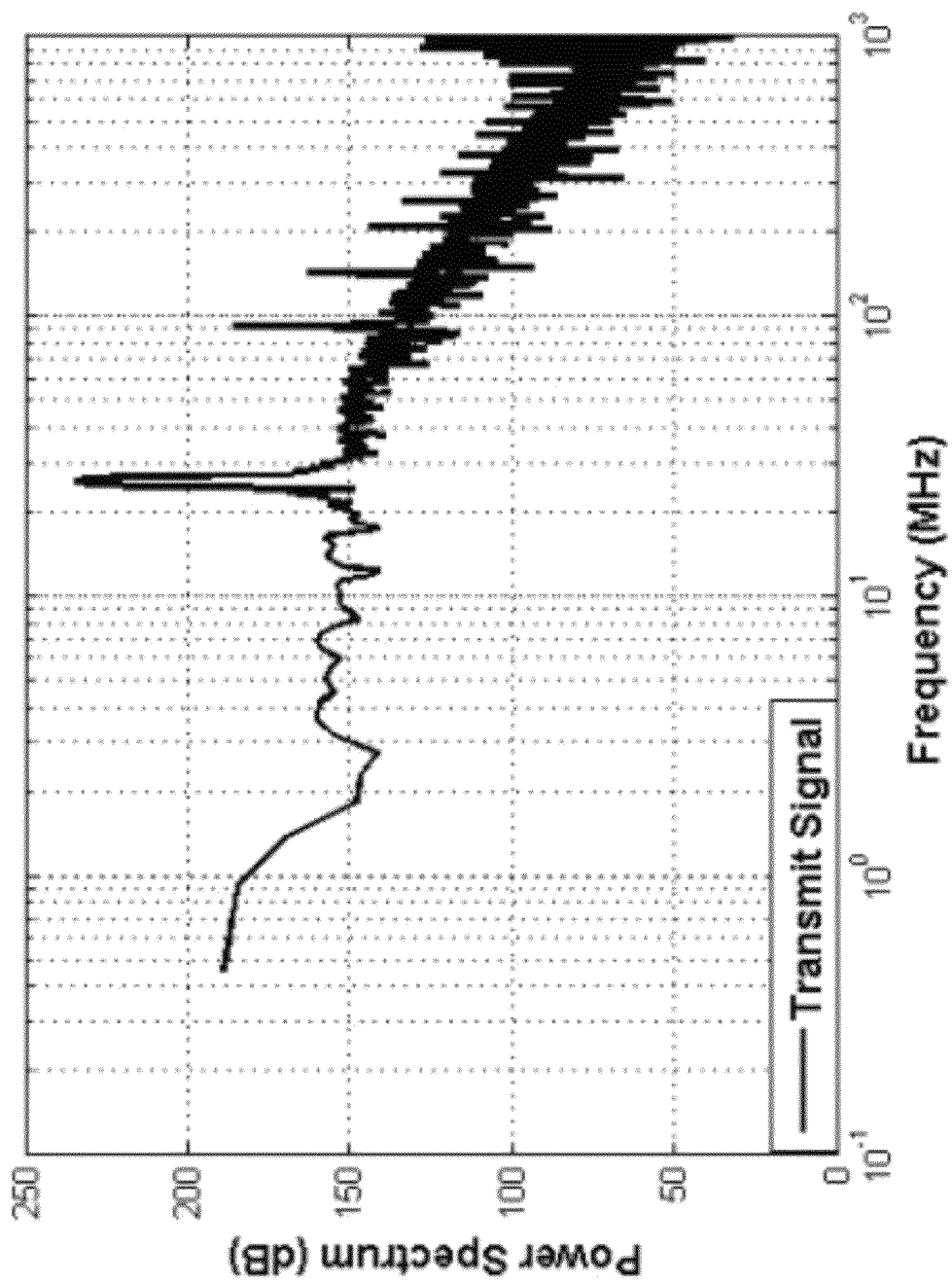
FIGS. 7A-7E show power spectra of a transmit signal (FIG. 7A), interference signal (FIG. 7B), cancellation signal (FIG. 7C), coarse residue (FIG. 7D) and fine residue (FIG. 7E), showing that the fine interference residue carried to the receiver is a very small part of the original interference signal.
Figure 7C:
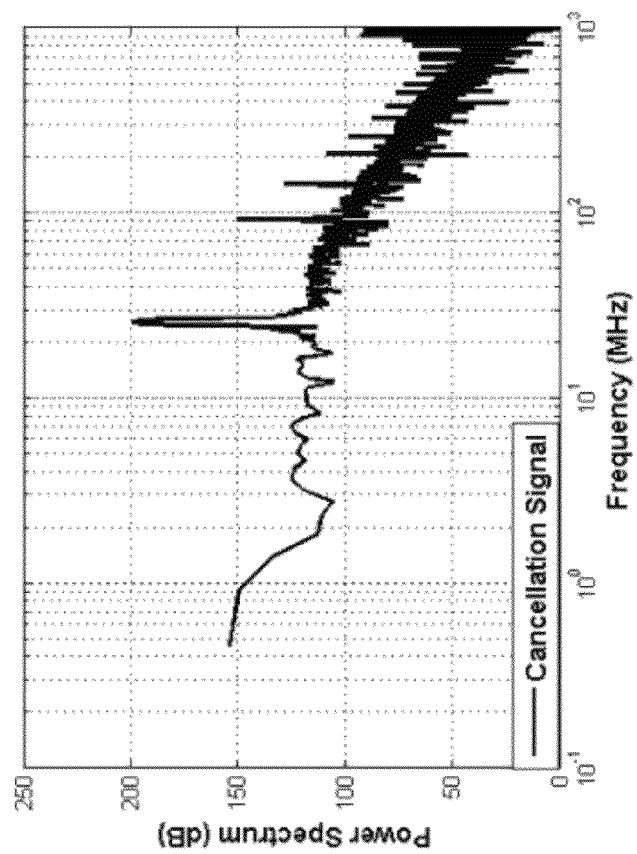
Figure 7B:
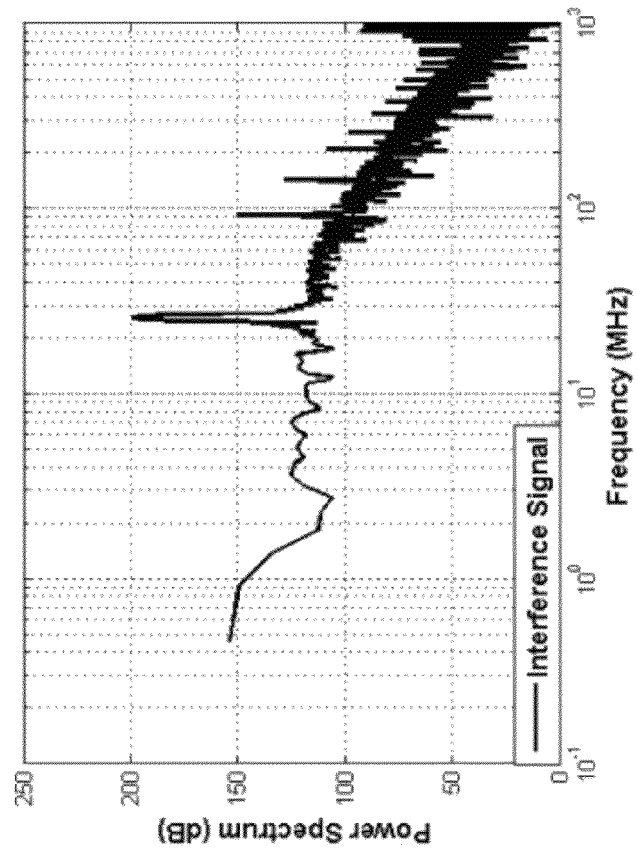
Figure 7E:
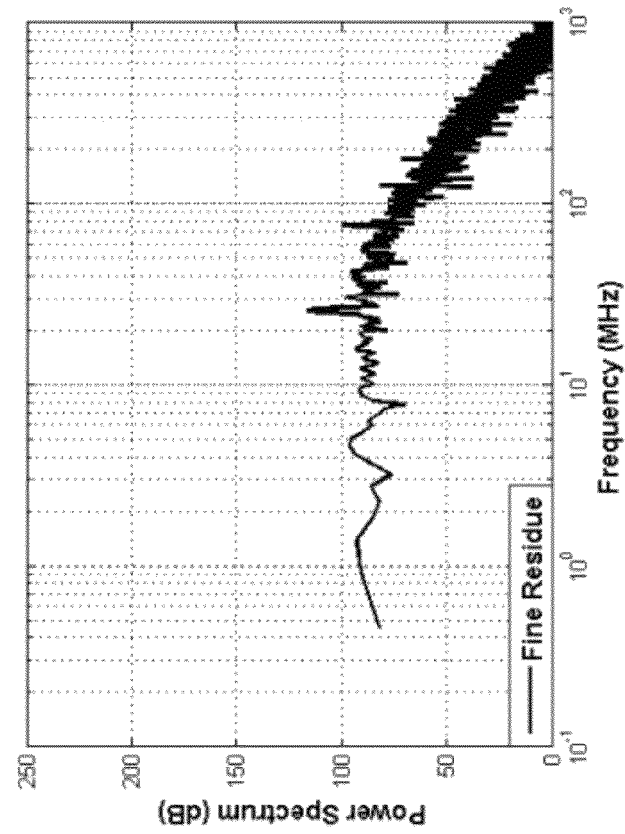
Figure 7D:
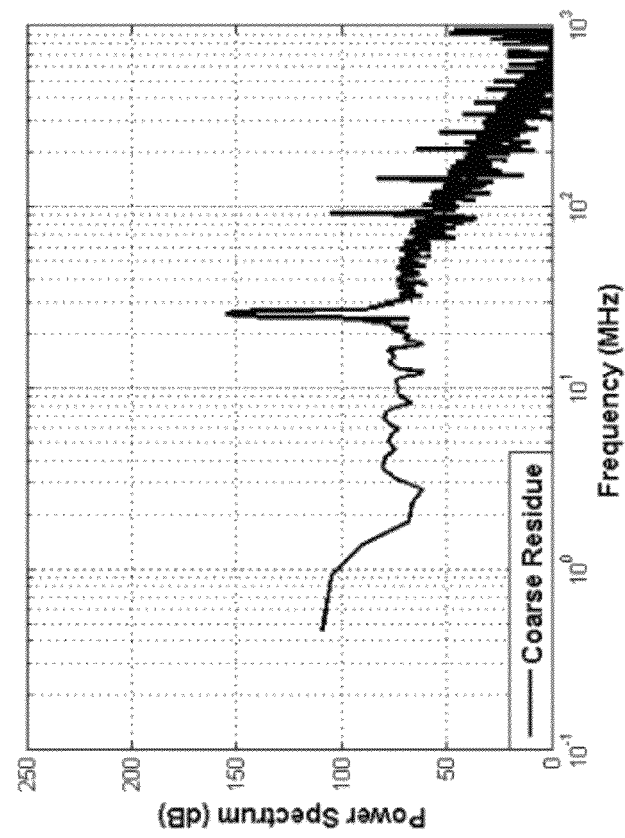

On the coarse cancellation path, a static gain of 72.7 dB is implemented to subtract the bulk of the interference in a coarse canceller at a high temperature stage. On the fine cancellation path, a gain of 8.2 dB is accomplished in the lookup table which is further amplified by a 20 dB gain in the output amplifier. FIGS. 6A and 6B show the power spectra of the coarse and fine cancellation signal, respectively. Both the signals are lowpass filtered with filter parameters the same as that on the transmit signal path. As seen, the interference is reduced by more than 36 dB in the fine cancellation stage.

As can be seen from FIGS. 7A-7E, which plots the power spectra of the transmit signal (FIG. 7A), interference signal (FIG. 7B), the digitally generated cancellation signal (FIG. 7C), the interference residue after the coarse cancellation stage (FIG. 7D), and the interference residue after the fine cancellation stage (FIG. 7E) which is carried to the receiver, a fraction of transmit signal is coupled to the receiver in form of interference. As is evident, a significant reduction of interference is achieved from the two-stage cancellation architecture. Thus, the two-stage cancellation architecture achieves greater than 80 dB reduction of high power interference and is 40 dB better than the single-stage cancellation architecture.

Figure 8B:
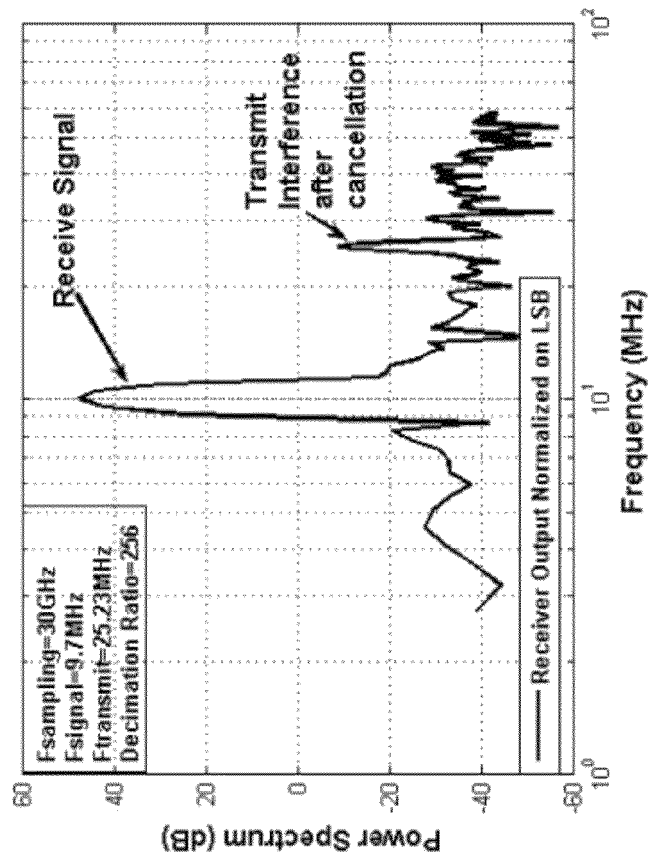
FIG. 8B shows the power spectrum of the receiver's decimated output after interference cancellation (Right).
Figure 8A:
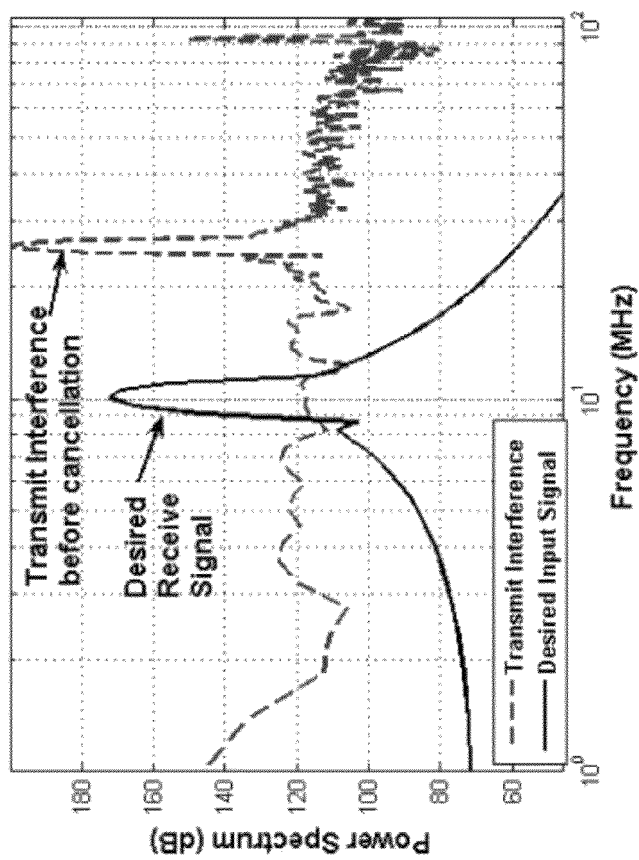
FIG. 8A shows a power spectrum of transmit interference before cancellation and the desired input signal (Left).

On the receiver side, the phase modulation-demodulation analog-to-digital converter (ADC) with a single junction quantizer is used as a lowpass, high dynamic range analog-to-digital converter. The lower sideband of the analog-to-digital converter is set to 30 µA. A 9.7 MHz sinusoid serves as the input signal. Since the ADC is a flux quantizing ADC, the current to flux converter serves as the input transformer that converts the input current to magnetic flux. The ADC is sampled at 30 GHz with a decimation ratio of 256 giving an output sample rate of 117 MHz. FIG. 8A shows the spectrum of the desired input signal and transmit interference before cancellation, whereas FIG. 8B shows the output spectrum of the receiver's decimated output after interference cancellation. The tallest peak in the receiver output spectrum corresponds to the input signal at 9.7 MHz, whereas the peak at 25.23 MHz corresponds to the transmit interference. As can be seen from FIG. 8B, the transmit interference is reduced by 80 dB. The spur free dynamic range (SFDR) of the ADC is 56.38 dB whereas the signal to noise ratio (SNR) is 55.89 dB in a 58 MHz bandwidth.

Simulation Model for the Self-Calibrating Two-Stage Hybrid Temperature Hybrid Technology Interference Cancellation Architecture A second simulation was carried out for a preferred embodiment of an adaptive, dynamic self-calibrating two-stage interference cancellation architecture. The static gain in the LUT may be adjusted manually or automatically to achieve high precision cancellation. In a static system subject to co-site interference, manual calibration may be acceptable, while in dynamic environments, automatic calibration may be preferred. Hence, the static cancellation architecture is largely insensitive to the environmental changes which necessitate periodic calibration of the delay and gain of the cancellation signal. The self-calibrating architecture dynamically adjusts the gain of the cancellation signal to compensate for any changes in the interference. The self-calibration mechanism digitally cross-correlates the baseband transmit signal with the receiver's decimated output and uses an adaptive algorithm to change the gain in the LUT. The process iterates until high precision cancellation is obtained.

Cross-Correlation

Cross correlation is a standard method of estimating the degree to which two series are correlated. For two series x(i) and y(i) where i=0, 1, 2 . . . N−1, the cross correlation r at delay d is defined as $$r(d) = \frac{\sum_i [(x(i) - mx) * (y(i-d) - my)]}{\sqrt{\sum_i [(x(i) - mx)^2} \sqrt{\sum_i [(y(i-d) - my)^2}}$$

Where, mx and my are the means of the corresponding series.

If x(i) and y(i) are similar series that are in phase with one another, then the correlation function r will be positive. If they are out of phase, the correlation will be negative. If they are uncorrelated, then r will tend toward 0 if the averaging time T is long enough. The phase delay time d can be adjusted to change the relation of correlated signals between fully in-phase to fully out-of-phase.

Self-Calibration Algorithm

Figure 9:
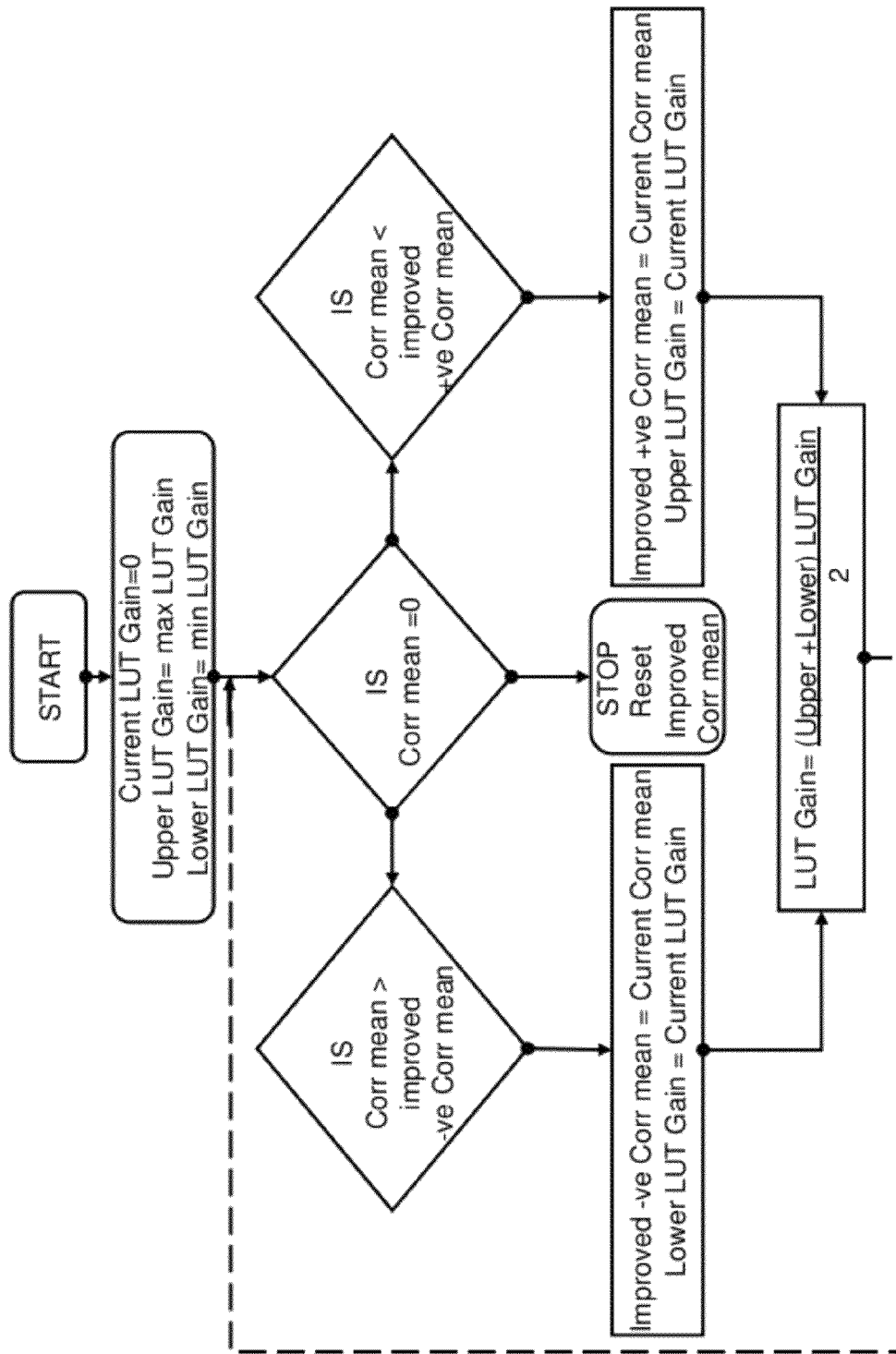
FIG. 9 shows a flow chart describing the adaptive algorithm used for interference cancellation.

FIG. 9 shows a flow chart describing the adaptive algorithm used for interference cancellation in a preferred embodiment shown in the simulation. In FIG. 9, "positive" is abbreviated "+ve" and "negative" is abbreviated "−ve". The goal of the adaptive algorithm is to adjust the gain in the LUT such that the mean of correlation between the decimated output of the receiver and the baseband transmit signal is driven towards zero. A zero mean signifies that the two signals are uncorrelated implying the interference is minimum. However, for a non-zero mean, the gain of the cancellation signal needs to be modified to achieve precise cancellation. A negative mean signifies additional gain required in the cancellation signal, whereas, a positive mean signifies the necessity to attenuate the cancellation signal. To start, the upper LUT gain is initialized to the maximum possible gain that can be implemented in the LUT. Similarly, the lower LUT gain is initialized to a negative number corresponding to the maximum possible attenuation that can be implemented in the LUT. The current value of the LUT gain is selected to be the arithmetic mean of the upper and lower LUT gains. For the current LUT gain, if the correlation mean is positive and lower than any previous positive correlation mean, the current LUT value becomes the 'Lower LUT Gain'. Similarly, for the current LUT gain, if the correlation mean is negative and higher than any previous negative correlation mean, the current LUT value becomes the 'Upper LUT Gain'. The next value of the LUT gain is again selected to be the arithmetic mean of the upper and lower LUT gains. Thus, the algorithm iteratively reduces the window between the upper and lower LUT gain, in the process optimizing the LUT gain such that the mean of correlation tends to zero. Practically it is very difficult to achieve a perfect zero mean. Hence, the algorithm iteratively optimizes the gain until a correlation mean sufficiently close to zero is achieved.

Simulation Results

On the receiver side, the phase modulation-demodulation analog-to-digital converter (ADC) with a single junction quantizer is used as a lowpass, high dynamic range analog-to-digital converter. The lower sideband of the analog-to-digital converter is set to 30 µA. A 9.7 MHz sinusoid serves as the input signal. Since the ADC is a flux quantizing ADC, the current to flux converter serves as the input transformer that converts the input current to magnetic flux. The ADC is sampled at 30 GHz with a decimation ratio of 256 giving an output sample rate of 117.18 MHz. On the coarse cancellation path, a static gain of 71.05 dB is implemented to subtract the bulk of the interference in a coarse canceller at a high temperature stage. On the fine cancellation path, a gain/attenuation of up to 4 times in amplitude or 12 dB can be accomplished in the LUT. This gain in the LUT is further amplified by a 49.8 dB gain in the output amplifier. Both the signals are lowpass filtered with filter parameters the same as those on the transmit signal path.

Figure 10:
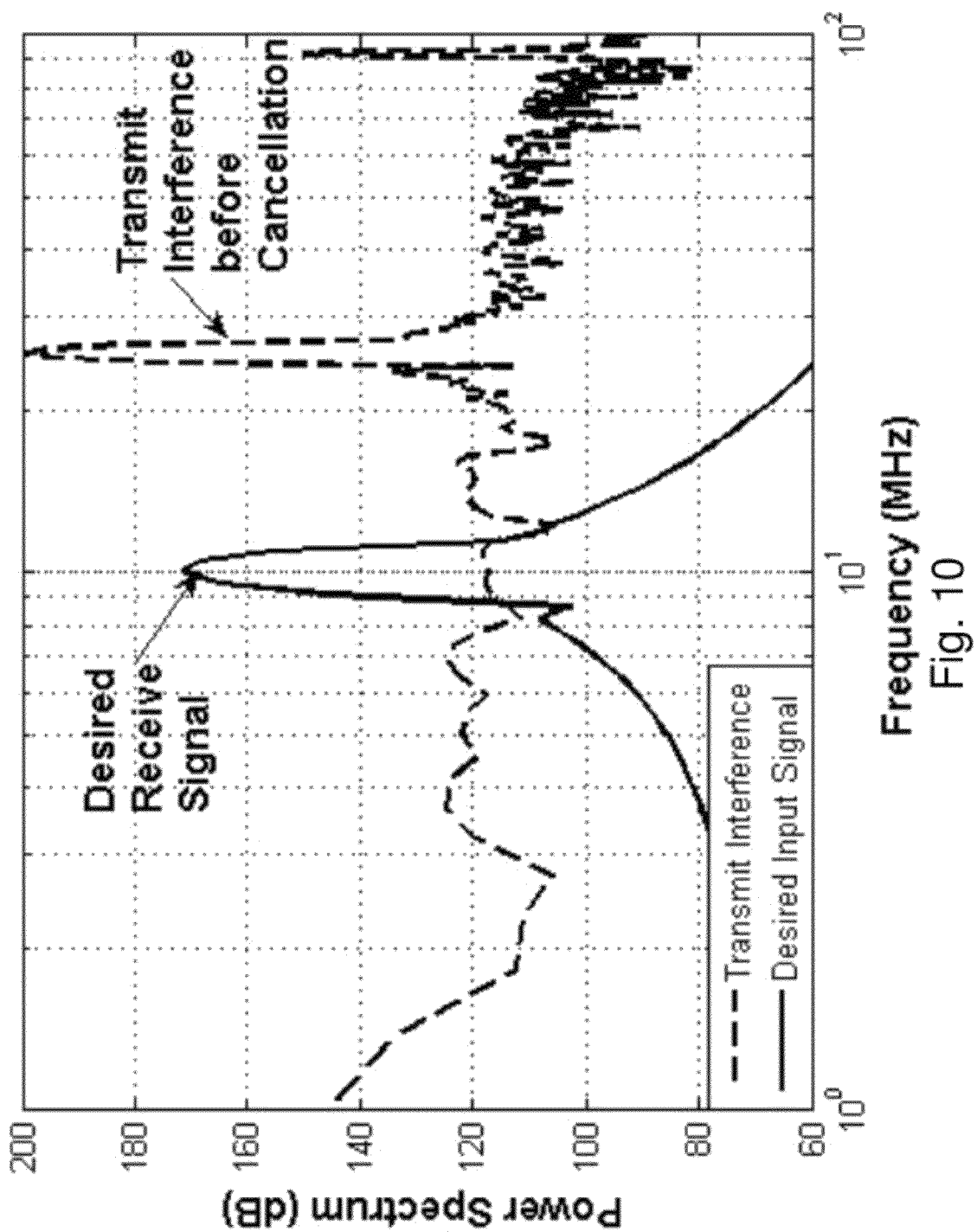
FIG. 10 shows a power spectrum of transmit interference before cancellation and the desired input signal.

As seen in the power spectrum shown in FIG. 10, the transmit interference is 30 dB higher than the desired receive signal. The baseband transmit signal is at an input frequency of 25.23 MHz, sampled at 117.18 MHz, further interpolated by a factor of 8, and followed by an oversampled sigma-delta modulator. For a meaningful correlation between the receiver's output and the baseband transmit signal, it is important that the sum of the desired input signal and co-site interference does not exceed the slew rate limit of the ADC. Thus, in case of high power interference it is essential to attenuate the input so that the ADC is not saturated. On successful interference cancellation, the full desired signal can be reapplied.

Figure 11:
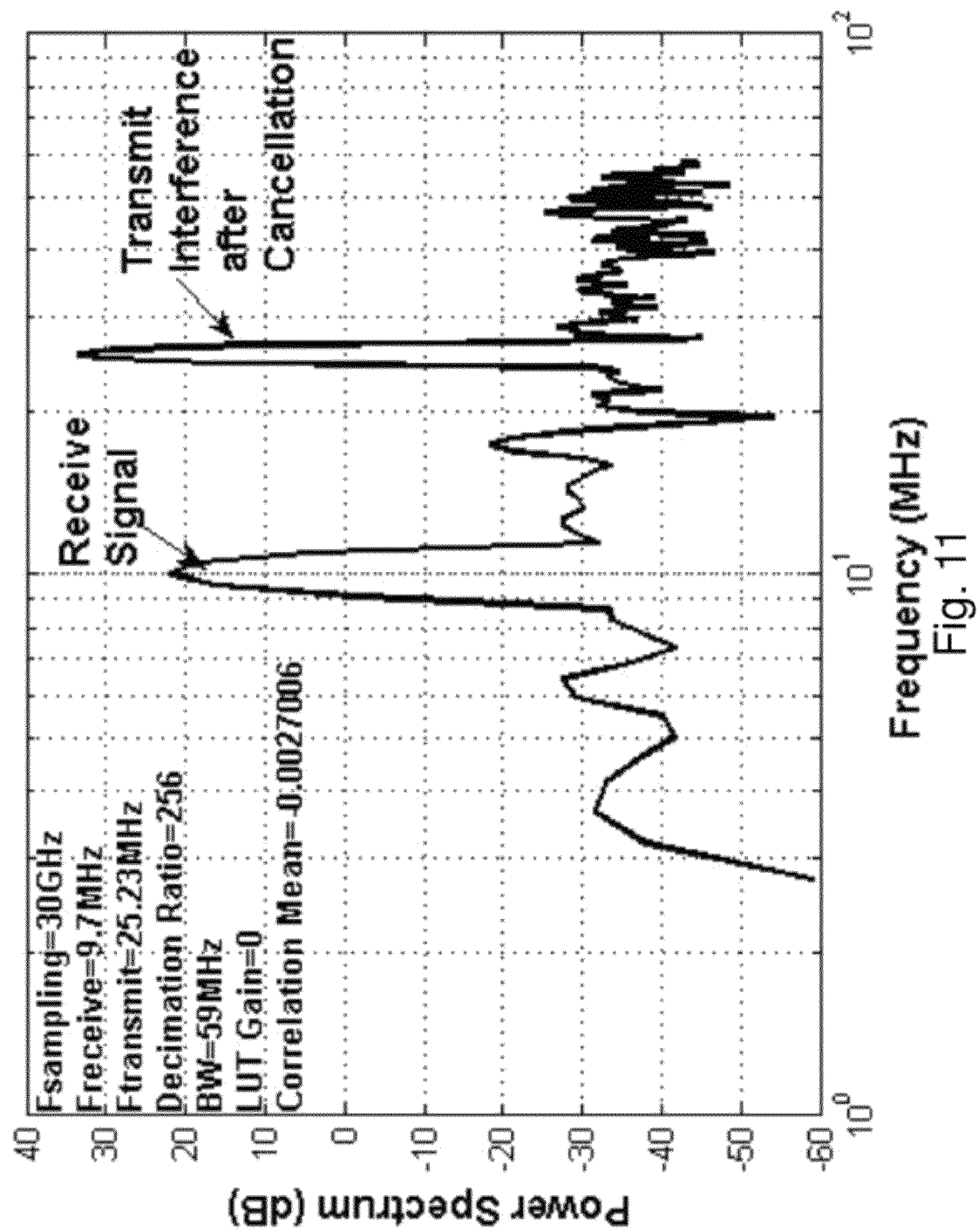
FIG. 11 shows a Power spectrum of the receiver's decimated output with zero gain implemented in the LUT.
Figure 12:
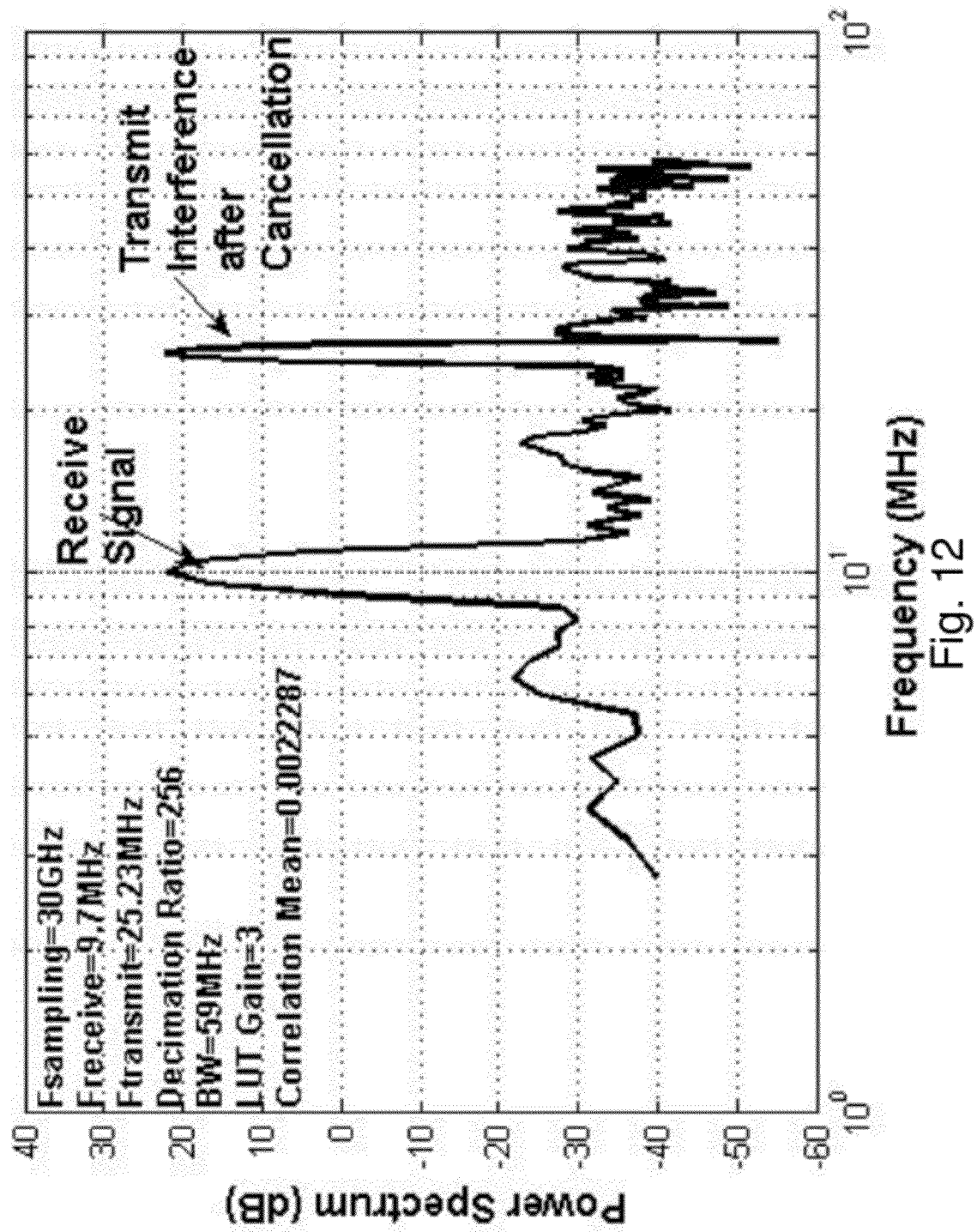
FIG. 12 shows a power spectrum of the receiver's decimated output with a gain of +3 implemented in the LUT.

The upper LUT gain and lower LUT gain are initialized to +4 and −4 respectively. Thus, the current LUT gain which is the arithmetic mean of the upper and lower LUT gains is zero. FIG. 11 shows the power spectrum of the receiver's decimated output. The interference peak is reduced by about 15 dB by the static gain implemented in the coarse cancellation path. However, a significant interference is carried to the receiver. The cross-correlation between the decimated output of the ADC and the baseband transmit signal has a mean value of −0.0027, resulting in a correlation mean of −0.0019. A negative mean signifies that additional gain is required to amplify the cancellation signal to match the interference. Hence the lower LUT gain is now modified to 0 with the upper LUT gain being +4. Thus, the current value of LUT gain is set to +2. The power spectrum in FIG. 12 shows a further reduction in the interference peak at 25.23 MHz, with a correlation mean of −0.0019. An improved negative correlation mean further modifies the lower LUT gain to +2 while the upper LUT gain remains at +4. Consequently, the gain in the LUT for the next iteration is set at +3.

The power spectrum in FIG. 12 shows a further reduction in the interference peak at 25.23 MHz, with a correlation mean of +0.0022. An improved positive correlation mean signifies lowering the gain in the LUT. Consequently, the upper LUT gain is modified to +3, whereas the lower LUT gain remains unchanged at +2. Thus, the gain in the LUT for the next iteration is set at +2.5.

The iteration process continues with the mean of correlation being +0.0007 for a gain of 2.5. The LUT gain is further modified to 2.25 resulting in a negative correlation mean of −0.0004, necessitating an increase in the LUT gain. Thus, the LUT gain is set to 2.375.

Figure 13:
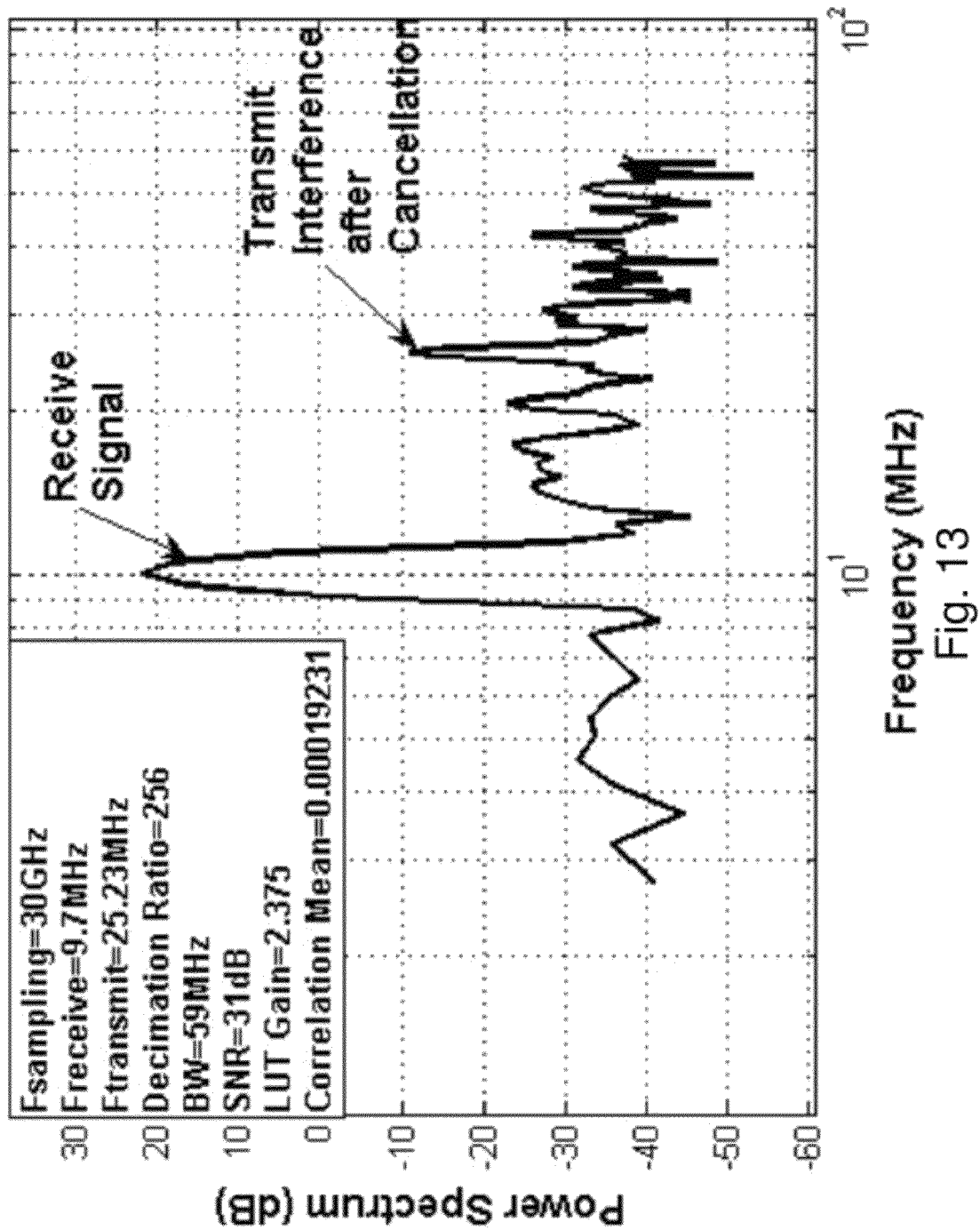
FIG. 13 shows a power spectrum of the receiver's decimated output with a gain of +2.375 implemented in the LUT.

The correlation mean is now 0.00019, sufficiently close to zero. The algorithm stops the optimization process on getting sufficiently close to zero. FIG. 13 shows the power spectrum of the ADC's decimated output. As can be seen, greater than 60 dB reduction of the interference peak has been achieved. The signal to noise ratio (SNR) of the ADC is 31 dB in a 59 MHz bandwidth.

Due to the limited dynamic range of the LUT, some of the LSB's of the interpolation filter are uncorrected. This in turn reflects as an error which is amplified by the gain on the fine cancellation path. Thus, for a given number of bits in the LUT, the precision of cancellation is a function of the gain on the fine cancellation path. This gain on the fine cancellation path is determined by the variations in the level of interference. For minor variations in the interference, the gain on the fine cancellation path can be lower. Consequently, further reduction of the interference can be achieved, up to the 80 dB reduction shown in the first ideal simulation.

Figure 14:
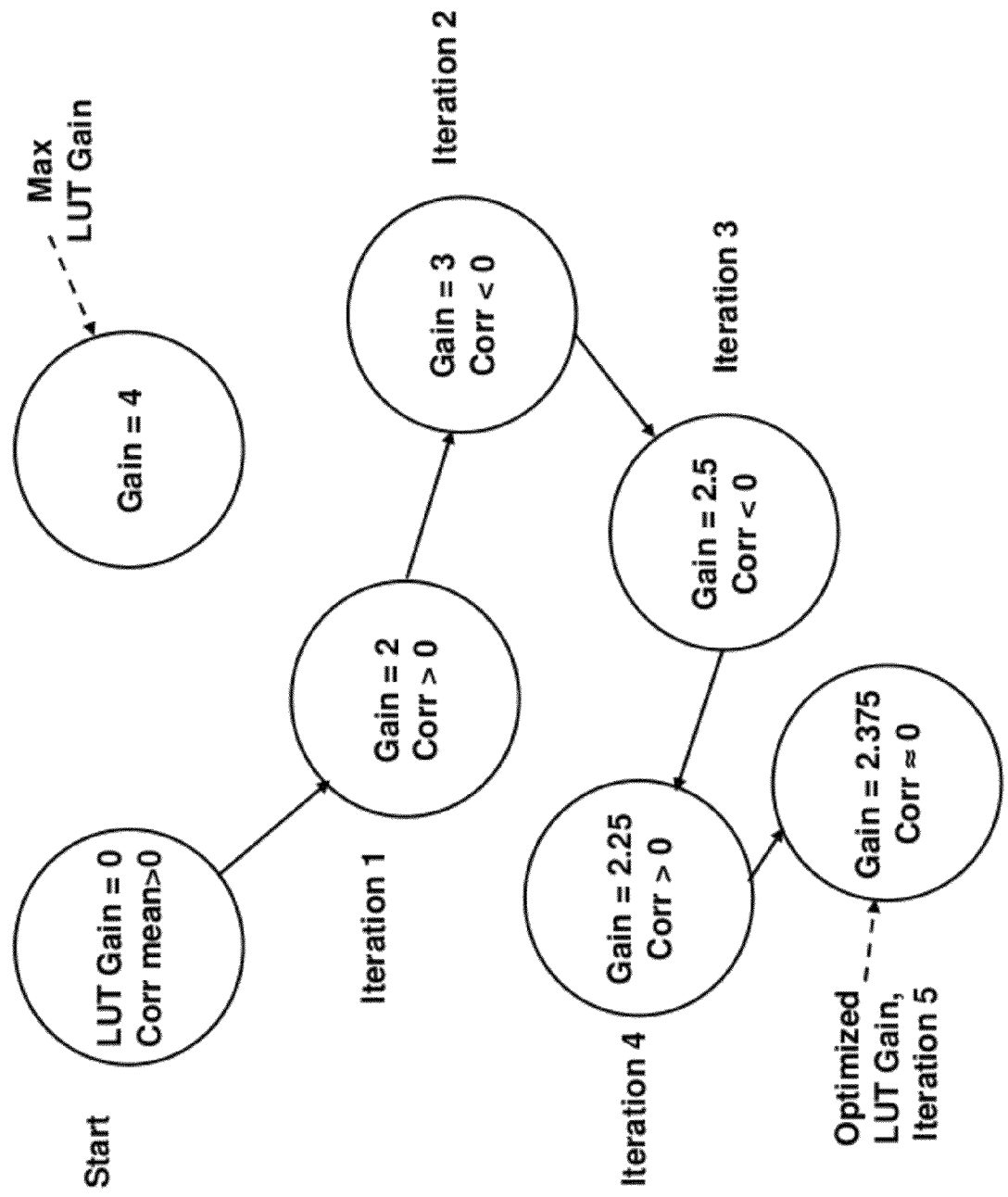
FIG. 14 shows Iterative changes in the LUT gain by the Self-calibrating mechanism to reduce interference cancellation.

FIG. 14 shows the iterative sequence of changes in the LUT gain to achieve high precision interference cancellation. For any further deviation of the correlation mean from zero, the adaptive algorithm springs back in action and readjusts the gain in the LUT, to minimize the interference. The successful implementation of the self-calibration mechanism makes the architecture robust and insensitive to environmental changes and other factors that may vary the interference magnitude.

The correlator may be implemented in a high speed superconductor technology, for example, integrated into the same superconducting device as a flux subtractor for the fine signal cancellation and the analog to digital convertor. However, an important deduction of this simulation results is the ability to correlate the outputs at low speed. This implies that the correlation no longer needs to be in the superconductor domain and can be easily moved to room temperature. Moreover, this permits implementation of highly sophisticated adaptive algorithms, including multi-bit correlation, that permit lower convergence time of the algorithm. Likewise, the correlator may reside close to the analog to digital convertor at superconducting temperatures, with room temperature electronics interfacing with this device.

A self-calibrating two-stage interference cancellation architecture has been designed, modeled and simulated. The self-calibrating mechanism cross-correlates the receiver's decimated output with the baseband transmit signal and iteratively adjusts the gain of the cancellation signal to minimize the interference. For a 31.5 dBm interferor at 25.23 MHz, the simulation shows greater than 60 dB reduction of the interference peak. For a 9.7 MHz input signal, signal-to-noise ratio of 31 dB is achieved in 58 MHz bandwidth.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method to detect a radio frequency signal-of-interest in an input signal, that also includes at least one interference signal, comprising:
   (a) generating a digital reference signal corresponding to the at least one interference signal in at least a waveform, a magnitude and a delay;
   (b) converting the digital reference signal to a corresponding analog coarse cancellation signal;
   (c) combining the input signal with the analog coarse cancellation signal in a coarse combiner to generate a coarse residue signal, wherein the interference signal is substantially cancelled and the signal-of-interest is substantially maintained;
   (d) generating a fine cancellation signal, corresponding to a residual interference signal in the coarse residue in at least a waveform, a magnitude and a delay;
   (e) combining the coarse residue signal with the fine cancellation signal in a fine combiner, to generate a fine residue signal, wherein the residual interference signal is substantially cancelled and the signal of interest is substantially maintained; and
   (f) digitizing the fine residue signal and detecting the signal-of-interest.

2. The method according to claim 1, wherein the fine cancellation signal is an analog signal generated based on a second digital reference signal.

3. The method of claim 2, further comprising:
   (a) digitally correlating the digitized fine residue signal with the second digital reference signal; and
   (b) using the time-averaged digital correlation output to provide an adaptive feedback control of at least one of the magnitude and delay of the fine cancellation signal.

4. The method of claim 3, further comprising applying an iterative algorithm to adjust at least one of the magnitude and delay of the fine cancellation signal, in order to reduce the time-averaged digital correlation output toward zero.

5. The method of claim 1, wherein the digital reference signal is provided by the source signal of an interference signal transmitter.

6. The method of claim 5, wherein at least one of the analog coarse cancellation signal and the fine cancellation signal comprises a linear combination of plurality of representations of a signal having respectively different magnitudes and delays.

7. The method according to claim 1, wherein the at least one interference signal comprises multipath interference, and wherein the analog coarse cancellation signal comprises a plurality of representations of the digital reference signal differing in respective magnitude and delay.

8. The method of claim 1, wherein the fine residue signal is digitized using a superconducting analog to digital converter.

9. The method of claim 1, wherein the fine cancellation signal is generated based on a digital lookup table which is adaptively updated.

10. The method of claim 1, wherein at least a portion of a power of the coarse residue signal is restricted from the fine combiner when the power of the coarse residue signal exceeds a threshold.

11. The method of claim 1, wherein the fine residue signal is digitized with a digitizer having a dynamic range, the dynamic range being insufficient to detect the signal of interest in the input signal, wherein the magnitude and delay of the digital reference signal and the fine cancellation signal are adjusted such that the dynamic range of the digitizer is sufficient to detect the signal-of-interest remaining in the fine residue signal.

12. The method of claim 1, wherein the fine combiner comprises a transformer with at least three coils.

13. The method of claim 12, wherein the transformer comprises a superconducting component.

14. The method of claim 1, wherein the converting comprises analog filtering an oversampled digital pulse train.

15. The method of claim 1, wherein at least one of the coarse cancellation signal and the fine cancellation signal is selectively delayed using a discrete digital time delay.

16. A system adapted to detect a radio frequency signal-of-interest in an input signal, that also includes at least one interference signal, comprising:
   (a) a coarse cancellation signal generator, producing a digital reference signal corresponding to the at least one interference signal in at least a waveform, a magnitude and a delay, which is converted to a corresponding analog coarse cancellation signal;
   (b) a coarse combiner, adapted to combine the input signal with the analog coarse cancellation signal to generate a coarse residue signal, wherein the interference signal is substantially cancelled and the signal-of-interest is substantially maintained;
   (d) a fine cancellation signal generator, producing a fine cancellation signal corresponding to a residual interference signal in the coarse residue in at least a waveform, a magnitude and a delay;
   (e) a fine combiner, adapted to combine the coarse residue signal with the fine cancellation signal, to generate a fine residue signal, wherein the residual interference signal is substantially cancelled and the signal of interest is substantially maintained; and
   (f) a digitizer adapted to digitize the fine residue signal from which the signal-of-interest is detectable.

17. The system according to claim 16, wherein the fine cancellation signal is an analog signal generated based on a second digital reference signal.

18. The system of claim 17, further comprising:
   (a) a digital correlator adapted to correlate the digitized fine residue signal with the second digital reference signal; and
   (b) an adaptive feedback control, using the time-averaged digital correlation output, to adjust at least one of the magnitude and delay of the fine cancellation signal.

19. The system of claim 18, further comprising a processor adapted to apply an iterative algorithm to adjust at least one of the magnitude and delay of the fine cancellation signal, in order to reduce the time-averaged digital correlation output toward zero.

20. The system of claim 16, wherein the digital reference signal is provided by the source signal of an interference signal transmitter.

21. The system of claim 20, wherein at least one of the analog coarse cancellation signal and the fine cancellation signal comprises a linear combination of plurality of representations of a signal having respectively different magnitudes and delays.

22. The system according to claim 16, wherein the at least one interference signal comprises multipath interference, and wherein the analog coarse cancellation signal comprises a plurality of representations of the digital reference signal differing in respective magnitude and delay.

23. The system of claim 16, wherein the digitizer comprises a superconducting analog to digital converter.

24. The system of claim 16, further comprising an adaptively updated a digital lookup table for generation of the fine cancellation signal.

25. The system of claim 16, further comprising a limited adapted to restrict at least a portion of a power of the coarse residue signal from the fine combiner when the power of the coarse residue signal exceeds a threshold.

26. The system of claim 16, wherein the digitizer has a dynamic range, the dynamic range being insufficient to detect the signal of interest in the input signal, wherein the magnitude and delay of the digital reference signal and the fine cancellation signal are adjusted such that the dynamic range of the digitizer is sufficient to detect the signal-of-interest remaining in the fine residue signal.

27. The system of claim 16, wherein the fine combiner comprises a transformer with at least three coils.

28. The system of claim 27, wherein the transformer comprises a superconducting component.

29. The system of claim 16, wherein the analog coarse cancellation signal generator comprises an analog filter adapted to filter an oversampled digital pulse train.

30. The system of claim 16, further comprising a discrete digital time delay adapted to selectively delay at least one of the coarse cancellation signal and the fine cancellation signal.

31. A receiver, comprising:
(a) an input adapted to receive an analog signal;
(b) a first combiner adapted to combine the analog signal with a first signal to produce a first combined signal with a reduced power of at least one interferor present in the analog signal;
(c) an overload protection device adapted to selectively block the first combined signal if it represents an overload condition, to produce an overload protected signal;
(d) a second combiner adapted to combine the overload protected signal, received by the second combiner substantially without introduction of intermodulation product of the analog signal and the first signal, with a second signal to produce a second combined signal; and
(e) a saturable detector, adapted to detect information within the second combined signal.

32. The receiver of claim 31, further comprising at least one of an analog amplifier, a digital amplifier, an analog filter, a digitizer, and a transformer.

33. The receiver of claim 32, wherein at least one of the analog amplifier, digital amplifier, analog filter, digitizer, transformer, overload protection device, and saturable detector operate at a cryogenic temperature below about 100 K.

* * * * *